US011063898B1

(12) United States Patent
Wu et al.

(10) Patent No.: US 11,063,898 B1
(45) Date of Patent: *Jul. 13, 2021

(54) SYSTEMS AND METHODS FOR CHAT WITH AUDIO AND VIDEO ELEMENTS

(71) Applicant: Snap Inc., Santa Monica, CA (US)

(72) Inventors: William Wu, Marina del Rey, CA (US); Nathan Kenneth Boyd, Los Angeles, CA (US); Newar Husam Al Majid, Santa Monica, CA (US); Erik Wagner, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,713

(22) Filed: Nov. 27, 2019

Related U.S. Application Data

(63) Continuation of application No. 15/470,624, filed on Mar. 27, 2017, now Pat. No. 10,530,731.

(Continued)

(51) Int. Cl.
  *H04L 12/58* (2006.01)
  *H04N 21/2368* (2011.01)
  (Continued)

(52) U.S. Cl.
  CPC ............. *H04L 51/32* (2013.01); *G06Q 50/01* (2013.01); *H04L 51/36* (2013.01); *H04L 51/38* (2013.01);
  (Continued)

(58) Field of Classification Search
  CPC ..... H04L 51/32; H04L 51/38; H04L 65/1016; H04L 51/36; H04N 21/2368; H04N 7/52;
  (Continued)

(56) References Cited

U.S. PATENT DOCUMENTS

| | | | |
|---|---|---|---|
| 5,689,667 A | 11/1997 | Kurtenbach | |
| 5,754,939 A | 5/1998 | Herz et al. | |
| | (Continued) | | |

FOREIGN PATENT DOCUMENTS

| | | | |
|---|---|---|---|
| CA | 2887596 A1 | 7/2015 | |
| CN | 104331246 A | 2/2015 | |
| | (Continued) | | |

OTHER PUBLICATIONS

"U.S. Appl. No. 14/740,843, Advisory Action dated Oct. 11, 2018", 5 pgs.

(Continued)

*Primary Examiner* — Tu T Nguyen
(74) *Attorney, Agent, or Firm* — Schwegman Lundberg & Woessner, P.A.

(57) ABSTRACT

Methods, devices, systems, and computer-readable media with instructions for text communications with imbedded audio or audiovisual elements are described. One embodiment involves displaying a user interface for chat communication with a time-ordered display space for communications. Text communications and audiovisual communications are each presented in associated rows within the user interface. Various embodiments enable audio or video notes as well as audio or video streaming or multi-user calls within the user interface with individual communications or connections presented within the time-ordered display. In some embodiments, communications within the display are deleted based on ephemeral message triggers.

17 Claims, 14 Drawing Sheets

Related U.S. Application Data

(60) Provisional application No. 62/314,232, filed on Mar. 28, 2016.

(51) Int. Cl.
*H04L 29/06* (2006.01)
*G06Q 50/00* (2012.01)
*H04N 7/52* (2011.01)
*H04N 21/63* (2011.01)
*H04N 21/43* (2011.01)

(52) U.S. Cl.
CPC ........... *H04L 65/1016* (2013.01); *H04N 7/52* (2013.01); *H04N 21/2368* (2013.01); *H04N 21/4307* (2013.01); *H04N 21/632* (2013.01)

(58) Field of Classification Search
CPC ... H04N 21/632; H04N 21/4307; G06Q 50/01
USPC ....................................................... 709/204
See application file for complete search history.

(56) References Cited

U.S. PATENT DOCUMENTS

| | | | |
|---|---|---|---|
| 6,038,295 A | 3/2000 | Mattes | |
| 6,158,044 A | 12/2000 | Tibbetts | |
| 6,167,435 A | 12/2000 | Druckenmiller et al. | |
| 6,205,432 B1 | 3/2001 | Gabbard et al. | |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,757,713 B1 | 6/2004 | Ogilvie et al. | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,478,402 B2 | 1/2009 | Christensen et al. | |
| 7,483,057 B2 | 1/2009 | Grosvenor et al. | |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,676,763 B2 | 3/2010 | Rummel | |
| 7,703,140 B2 | 4/2010 | Nath et al. | |
| 7,912,896 B2 | 3/2011 | Wolovitz et al. | |
| 8,063,929 B2 | 11/2011 | Kurtz et al. | |
| 8,131,597 B2 | 3/2012 | Hudetz | |
| 8,170,957 B2 | 5/2012 | Richard | |
| 8,199,747 B2 | 6/2012 | Rojas et al. | |
| 8,214,443 B2 | 7/2012 | Hamburg | |
| 8,219,930 B2 | 7/2012 | Johns | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,549,432 B2 | 10/2013 | Warner | |
| 8,570,907 B2 | 10/2013 | Garcia, Jr. et al. | |
| 8,578,295 B2 | 11/2013 | Chmielewski et al. | |
| 8,627,233 B2 | 1/2014 | Cragun et al. | |
| 8,718,333 B2 | 5/2014 | Wolf et al. | |
| 8,724,622 B2 | 5/2014 | Rojas | |
| 8,745,132 B2 | 6/2014 | Obradovich | |
| 8,756,508 B2 | 6/2014 | Ohki et al. | |
| 8,760,557 B2 | 6/2014 | Rydenhag et al. | |
| 8,874,677 B2 | 10/2014 | Rosen et al. | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,148,424 B1 | 9/2015 | Yang | |
| 9,191,776 B2 | 11/2015 | Root et al. | |
| 9,204,252 B2 | 12/2015 | Root | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,264,463 B2 | 2/2016 | Rubinstein et al. | |
| 9,276,886 B2 | 3/2016 | Samaranayake | |
| 9,294,425 B1 | 3/2016 | Son | |
| 9,383,897 B2 | 7/2016 | Cragun et al. | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,436,380 B2 | 9/2016 | Chmielewski et al. | |
| 9,443,227 B2 | 9/2016 | Evans et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,560,006 B2 | 1/2017 | Prado et al. | |
| 9,591,349 B2 | 3/2017 | Assayag et al. | |
| 9,628,950 B1 | 4/2017 | Noeth et al. | |
| 9,652,896 B1 | 5/2017 | Jurgenson et al. | |
| 9,659,244 B2 | 5/2017 | Anderton et al. | |
| 9,693,191 B2 | 6/2017 | Sehn | |
| 9,705,831 B2 | 7/2017 | Spiegel | |
| 9,742,713 B2 | 8/2017 | Spiegel et al. | |
| 9,785,796 B1 | 10/2017 | Murphy et al. | |
| 9,825,898 B2 | 11/2017 | Sehn | |
| 9,854,219 B2 | 12/2017 | Sehn | |
| 9,961,520 B2 | 5/2018 | Brooks et al. | |
| 10,057,542 B2 | 8/2018 | Segal | |
| 10,503,264 B1 | 12/2019 | Blachly et al. | |
| 10,530,731 B1 | 1/2020 | Wu et al. | |
| 10,969,781 B1 | 4/2021 | Tofte et al. | |
| 2002/0047868 A1 | 4/2002 | Miyazawa | |
| 2002/0144154 A1 | 10/2002 | Tomkow | |
| 2003/0052925 A1 | 3/2003 | Daimon et al. | |
| 2003/0126215 A1 | 7/2003 | Udell | |
| 2003/0217106 A1 | 11/2003 | Adar et al. | |
| 2004/0203959 A1 | 10/2004 | Coombes | |
| 2005/0097176 A1 | 5/2005 | Schatz et al. | |
| 2005/0198128 A1 | 9/2005 | Anderson | |
| 2005/0223066 A1 | 10/2005 | Buchheit et al. | |
| 2006/0242239 A1 | 10/2006 | Morishima et al. | |
| 2006/0270419 A1 | 11/2006 | Crowley et al. | |
| 2006/0271691 A1 | 11/2006 | Jacobs et al. | |
| 2007/0038715 A1 | 2/2007 | Collins et al. | |
| 2007/0064899 A1 | 3/2007 | Boss et al. | |
| 2007/0073823 A1 | 3/2007 | Cohen et al. | |
| 2007/0214216 A1 | 9/2007 | Carrer et al. | |
| 2007/0233801 A1 | 10/2007 | Eren et al. | |
| 2008/0055269 A1 | 3/2008 | Lemay et al. | |
| 2008/0120409 A1 | 5/2008 | Sun et al. | |
| 2008/0207176 A1 | 8/2008 | Brackbill et al. | |
| 2008/0270938 A1 | 10/2008 | Carlson | |
| 2008/0306826 A1 | 12/2008 | Kramer et al. | |
| 2008/0313346 A1 | 12/2008 | Kujawa et al. | |
| 2009/0042588 A1 | 2/2009 | Lottin et al. | |
| 2009/0132453 A1 | 5/2009 | Hangartner et al. | |
| 2009/0187860 A1 | 7/2009 | Fleck et al. | |
| 2010/0082427 A1 | 4/2010 | Burgener et al. | |
| 2010/0084513 A1 | 4/2010 | Gariepy et al. | |
| 2010/0088151 A1 | 4/2010 | Kim et al. | |
| 2010/0100855 A1 | 4/2010 | Yoo | |

(56) References Cited

U.S. PATENT DOCUMENTS

| | | |
|---|---|---|
| 2010/0131880 A1 | 5/2010 | Lee et al. |
| 2010/0185665 A1 | 7/2010 | Horn et al. |
| 2010/0192101 A1 | 7/2010 | Chmielewski |
| 2010/0192102 A1 | 7/2010 | Chmielewski et al. |
| 2010/0192103 A1 | 7/2010 | Cragun et al. |
| 2010/0251180 A1 | 9/2010 | Cragun et al. |
| 2010/0306669 A1 | 12/2010 | Della Pasqua |
| 2011/0029884 A1 | 2/2011 | Grosz et al. |
| 2011/0066980 A1 | 3/2011 | Chmielewski et al. |
| 2011/0093815 A1 | 4/2011 | Gobeil |
| 2011/0099507 A1 | 4/2011 | Nesladek et al. |
| 2011/0126250 A1 | 5/2011 | Turner |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2011/0320571 A1 | 12/2011 | Woo et al. |
| 2012/0011267 A1 | 1/2012 | Ma |
| 2012/0013539 A1 | 1/2012 | Hogan et al. |
| 2012/0028659 A1 | 2/2012 | Whitney et al. |
| 2012/0079386 A1 | 3/2012 | Kim et al. |
| 2012/0184248 A1 | 7/2012 | Speede |
| 2012/0192093 A1 | 7/2012 | Migos et al. |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0278762 A1 | 11/2012 | Mouilleseaux et al. |
| 2012/0304080 A1 | 11/2012 | Wormald et al. |
| 2012/0308209 A1 | 12/2012 | Zaletel |
| 2013/0063380 A1 | 3/2013 | Wang et al. |
| 2013/0071093 A1 | 3/2013 | Hanks et al. |
| 2013/0096575 A1 | 4/2013 | Olson |
| 2013/0121481 A1 | 5/2013 | Mikan et al. |
| 2013/0194301 A1 | 8/2013 | Robbins et al. |
| 2013/0271618 A1 | 10/2013 | Koryakovskiy et al. |
| 2013/0290443 A1 | 10/2013 | Collins et al. |
| 2013/0311916 A1 | 11/2013 | Weng Fuliang et al. |
| 2014/0032682 A1 | 1/2014 | Prado et al. |
| 2014/0071063 A1 | 3/2014 | Kuscher et al. |
| 2014/0075388 A1 | 3/2014 | Kuscher et al. |
| 2014/0081620 A1 | 3/2014 | Solntseva |
| 2014/0092100 A1 | 4/2014 | Chen |
| 2014/0122787 A1 | 5/2014 | Shalvi et al. |
| 2014/0137042 A1 | 5/2014 | Du et al. |
| 2014/0149916 A1 | 5/2014 | Manoff et al. |
| 2014/0157210 A1 | 6/2014 | Katz et al. |
| 2014/0160054 A1 | 6/2014 | Rabii et al. |
| 2014/0201527 A1 | 7/2014 | Krivorot |
| 2014/0204247 A1 | 7/2014 | Bilgen et al. |
| 2014/0282096 A1 | 9/2014 | Rubinstein et al. |
| 2014/0282161 A1 | 9/2014 | Cash |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2014/0375834 A1 | 12/2014 | Lohan et al. |
| 2015/0033143 A1* | 1/2015 | Lee ..................... H04L 51/16 715/752 |
| 2015/0046876 A1 | 2/2015 | Goldenberg |
| 2015/0077502 A1 | 3/2015 | Jordan et al. |
| 2015/0199082 A1 | 7/2015 | Scholler et al. |
| 2015/0227602 A1 | 8/2015 | Ramu et al. |
| 2015/0271395 A1 | 9/2015 | Taylor |
| 2015/0312400 A1 | 10/2015 | Hansen |
| 2015/0338888 A1 | 11/2015 | Kim et al. |
| 2015/0341903 A1* | 11/2015 | Jeong ................. H04M 1/7253 455/458 |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0127534 A1* | 5/2016 | Celik ................. H04M 1/72519 455/566 |
| 2016/0180887 A1 | 6/2016 | Sehn |
| 2016/0188191 A1 | 6/2016 | Renard et al. |
| 2016/0277419 A1 | 9/2016 | Allen et al. |
| 2016/0277802 A1 | 9/2016 | Bernstein et al. |
| 2016/0283106 A1 | 9/2016 | Thorne |
| 2016/0321708 A1 | 11/2016 | Sehn |
| 2016/0359957 A1 | 12/2016 | Laliberte |
| 2016/0359987 A1 | 12/2016 | Laliberte |
| 2017/0161382 A1 | 6/2017 | Ouimet et al. |
| 2017/0163929 A1 | 6/2017 | Maliuk et al. |
| 2017/0256288 A1 | 9/2017 | Ai et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0344253 A1 | 11/2017 | Zhang |
| 2017/0374003 A1 | 12/2017 | Allen et al. |
| 2017/0374508 A1 | 12/2017 | Davis et al. |
| 2018/0032224 A1 | 2/2018 | Cornell et al. |

FOREIGN PATENT DOCUMENTS

| | | |
|---|---|---|
| WO | WO-2012000107 A1 | 1/2012 |
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"U.S. Appl. No. 14/740,843, Final Office Action dated Apr. 7, 2017", 15 pgs.

"U.S. Appl. No. 14/740,843, Final Office Action dated Jun. 10, 2019", 22 pgs.

"U.S. Appl. No. 14/740,843, Final Office Action dated Jul. 19, 2018", 18 pgs.

"U.S. Appl. No. 14/740,843, Non Final Office Action dated Feb. 26, 2019", 18 pgs.

"U.S. Appl. No. 14/740,843, Non Final Office Action dated Oct. 24, 2016", 14 pgs.

"U.S. Appl. No. 14/740,843, Non Final Office Action dated Nov. 30, 2017", 16 pgs.

"U.S. Appl. No. 14/740,843, Notice of Allowance dated Jul. 31, 2019", 8 pgs.

"U.S. Appl. No. 14/740,843, Response filed Feb. 24, 2017 to Non Final Office Action dated Oct. 24, 2016", 11 pgs.

"U.S. Appl. No. 14/740,843, Response filed Mar. 28, 2018 to Non Final Office Action dated Nov. 30, 2017", 10 pgs.

"U.S. Appl. No. 14/740,843, Response filed Jul. 7, 2017 to Final Office Action dated Apr. 7, 2017", 19 pgs.

"U.S. Appl. No. 14/740,843, Response filed Sep. 19, 2018 to Final Office Action dated Jul. 19, 2018".

"U.S. Appl. No. 14/740,843, Response filed Nov. 19, 2018 to Advisory Action dated Oct. 11, 2018", 12 pgs.

"U.S. Appl. No. 14/740,843, Response filed May 7, 2019 to Non Final Office Action dated Feb. 26, 2019", 11 pgs.

"U.S. Appl. No. 15/470,624, Corrected Notice of Allowability dated Nov. 21, 2019", 2 pgs.

"U.S. Appl. No. 15/470,624, Non Final Office Action dated Mar. 21, 2019", 11 pgs.

"U.S. Appl. No. 15/470,624, Notice of Allowance dated Aug. 22, 2019", 7 pgs.

"U.S. Appl. No. 15/470,624, Response filed Jul. 22, 2019 to Non-Final Office Action dated Mar. 21, 2019", 14 pgs.

"MCSwipeTableViewCell", GitHub Inc., [Online]. Retrieved from the Internet: <URL: https://github.com/alikaragoz/MCSwipeTableViewCell/, (2015), 5 pgs.

Gallagher, Fergal, "Meerkat App That Allows You To Post Live Streaming Video To Twitter Goes Viral", Tech Times, [Online].

(56) References Cited

OTHER PUBLICATIONS

Retrieved from the Internet: <URL: http://www.techtimes.com/articles/37029/20150303/meerkat-video-streaming-app-explodes-onto-iphones.htm, (Mar. 3, 2015), 4 pgs.

Jasper, Brad, "Recreating the Radial Menu from iMessages in iOS 8", [Online]. Retrieved from the Internet: <URL: bradjasper.com/blog/radialmenu-imessage-ios8/, (2014), 3 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Strange, Andario, "Want to save Meerkat videos to YouTube? Katch's hashtag wants to help", Mashable, [Online]. Retrieved from the Internet: <URL: http://mashable.com/2015/03/22/katch-for-meerkat/, (Mar. 22, 2015), 12 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet; <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

"U.S. Appl. No. 16/670,222, Non Final Office Action dated Dec. 22, 2020", 10 pgs.

"U.S. Appl. No. 16/670,222, Notice of Allowance dated May 27, 2021", 7 pgs.

"U.S. Appl. No. 16/670,222, Response filed Mar. 18, 2021 to Non Final Office Action dated Dec. 22, 2020", 10 pgs.

\* cited by examiner

SYSTEMS AND METHODS FOR CHAT WITH AUDIO AND VIDEO ELEMENTS

CLAIM OF PRIORITY

This Application is a Continuation of U.S. patent application Ser. No. 15/470,624, filed Mar. 27, 2017, which claims the benefit of priority of U.S. Provisional Application Ser. No. 62/314,232, filed Mar. 28, 2016, which applications are incorporated herein by reference in their entireties.

TECHNICAL FIELD

Embodiments pertain to communications systems and, in some embodiments, to mobile device text communications and interfaces with added video and/or audio elements.

BACKGROUND

"Online chat" refers to communications via a network with real-time transmission of text messages between users. These messages are generally short in order to enable participants to respond quickly, creating the feeling of a conversation. Such communications are often between two users, and structured as point-to-point communications, but can also be multicast or structured as group communications.

BRIEF DESCRIPTION OF THE DRAWINGS

Various ones of the appended drawings merely illustrate example embodiments of the present disclosure and should not be considered as limiting its scope.

DETAILED DESCRIPTION

Embodiments described herein pertain to text communications between devices and additional communications (e.g., audio and/or video content) embedded in a chat interface with text communications. In some embodiments, one or two-way streaming video, one or two-way streaming audio, or non-streaming audio or video "notes" are included in a chat messaging environment. Some embodiments may operate in the context of a social networking environment where client devices may not only chat (e.g., send text messages) but may also send ephemeral photographs and video clips to a friend or to groups of friends.

In this context, a "friend" is a user account associated with one or more devices that has been associated with another account, either by a friend request and response, or some other such association method. In various embodiments, a user may enter a chat interface for a friend, and begin sending text messages. At any time, one user may record audio or video content, and make this content data available to be presented to the friend within the chat interface in a format structured to fit within the chat interface without dominating the chat interface. One such format is a time-ordered presentation, with the most recent messages presented in one or more lines lower down the screen, and lines above this presenting older messages in the order received. Video and audio clips may be identified as circles within one or more lines of the interface. A user may be notified of the availability of streaming audio or video by the presentation of an interface within lines of the chat interface to allow the user to join two-way streaming, accept a one-way stream from the friend, or ignore the streaming data. Depending on the response, different information is presented within lines of the chat interface. As additional messages are received, older messages are shifted further up in a display area.

Additionally, a user may initiate a streaming video or audio communication with friends, or may accept a video or audio transmission from friends, within the chat interface. At any time, a video or audio transmission managed from within a chat view may be set as a one-way communication in either direction or a two-way communication depending on the acceptance of the incoming audio or video from the other party by the user and the friend. Unless a full screen view is selected, the chat interface remains during presentation of video and/or audio content, allowing text chat to continue. In some such systems, the chat messages and any audio or video elements embedded with chat messages are ephemeral, and are automatically deleted based on a deletion trigger. Some such systems are embodied by a device where a single user interface is used for text communications, voice communications, and video communications, and particularly a user interface with voice and video communications embedded between text communications.

Figure 1:
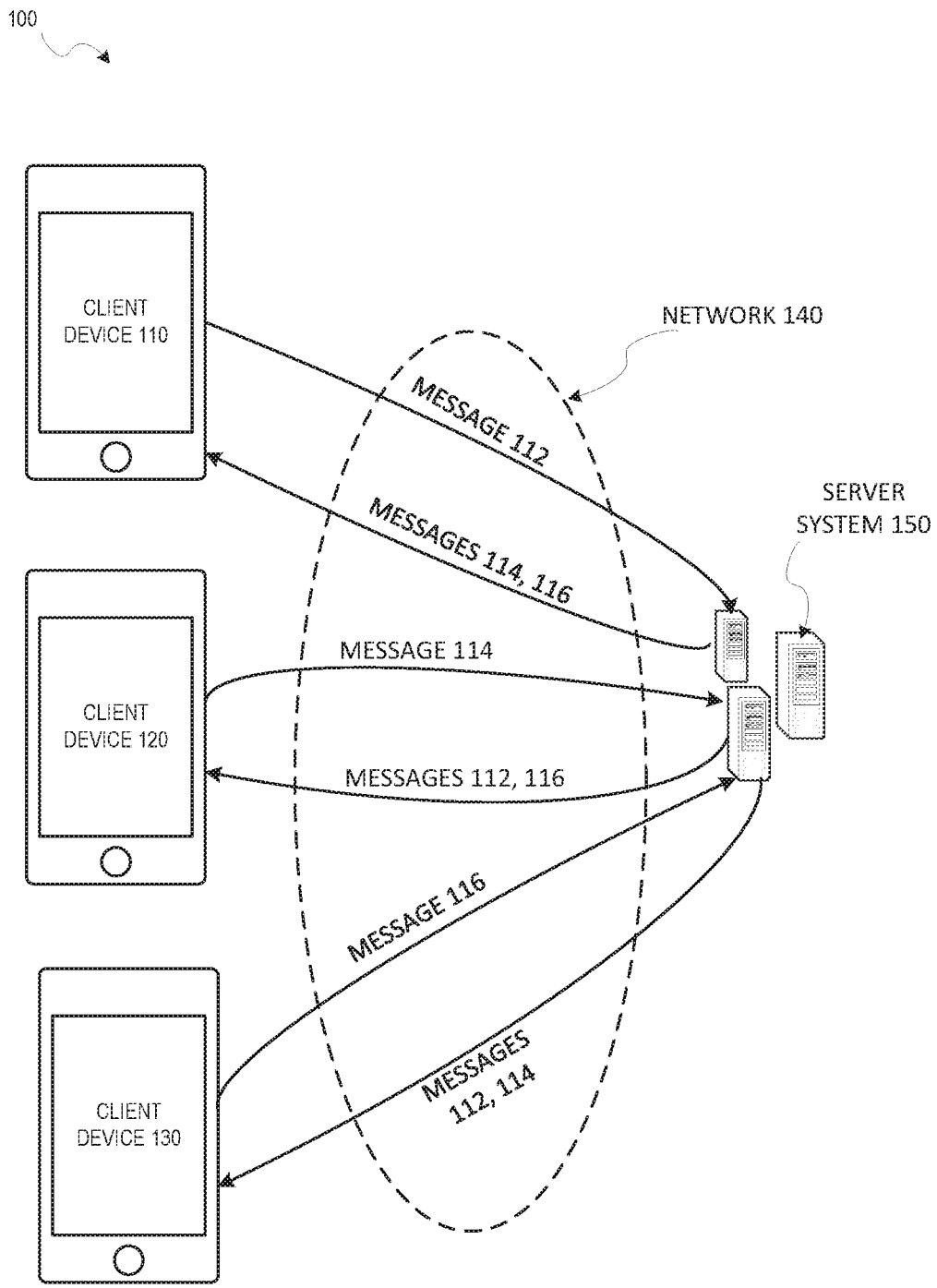
FIG. 1 is a block diagram illustrating a networked system, according to some example embodiments.

FIG. 1 is a block diagram illustrating a networked system 100 according to some example embodiments. System 100 includes client devices 110, 120, and 130 as well as server system 150 and network 140. Network 140 is used to convey communications between client devices 110, 120, 130 and the server system 150. Client devices 110, 120, and 130 may be any smartphone, tablet, phablet, laptop computer, network-enabled camera, or any other such network-enabled device. Client devices 110, 120, 130 may include a keyboard or touchscreen for entering text information, as well as a camera device for capturing additional content that may be part of a supplemental (e.g., non-text) communication between users or members of a group. Client devices 110, 120, 130 are connected to server system 150 via network 140. The network 140 may include any combination of wired and wireless connections. This may include cellular access networks, access point interfaces to the Internet, or any other such networks 140 or network elements. For example, client device 110 may interface with network 140 using a Long Term Evolution (LTE) cellular network to communicate with server system 150, while client device 120 may use a Wi-Fi access point to interface with network 140 and communicate with server system 150. Server system 150 may be one or more computing devices as part of a server or network computing system. In certain embodiments, particularly embodiments with large numbers of client devices 110, 120, 130 interfacing with a server system 150 from widely different locations all over the globe, server system 150 may be a distributed network 140 of server computers that are similarly widely distributed, and which communicate with each other via network 140. In some embodiments, client devices 110, 120, 130, as well as any elements of server system 150 and network 140, may be implemented using elements of architecture of software 702 or machine 900 described in FIGS. 7 and 9.

Networked system 100 may be used in communication of messages between client devices 110, 120, 130. In the embodiment discussed below, client devices 110, 120, and 130 are each associated with a different user account, and each of these user accounts for devices 110, 120, and 130 are configured for texting communications. Additional audio, video, and streaming communications configured for presentation within a chat interface are also available in various embodiments. The devices 110, 120, and 130 send messages via network 140 and system 150, and receive messages via the same route.

Each device 110, 120, and 130 includes a feed interface that may be part of an application operating on the respective client device 110, 120, 130. When chat messages are received, a notifier appears in the feed. In this way, an individual chat, or other message, may be accessed. A selection within the feed may navigate a user to a chat view. This allows access to chat with another single user as described below, with an interface enabling video and/or audio communications in addition to text chat.

Figure 2A:
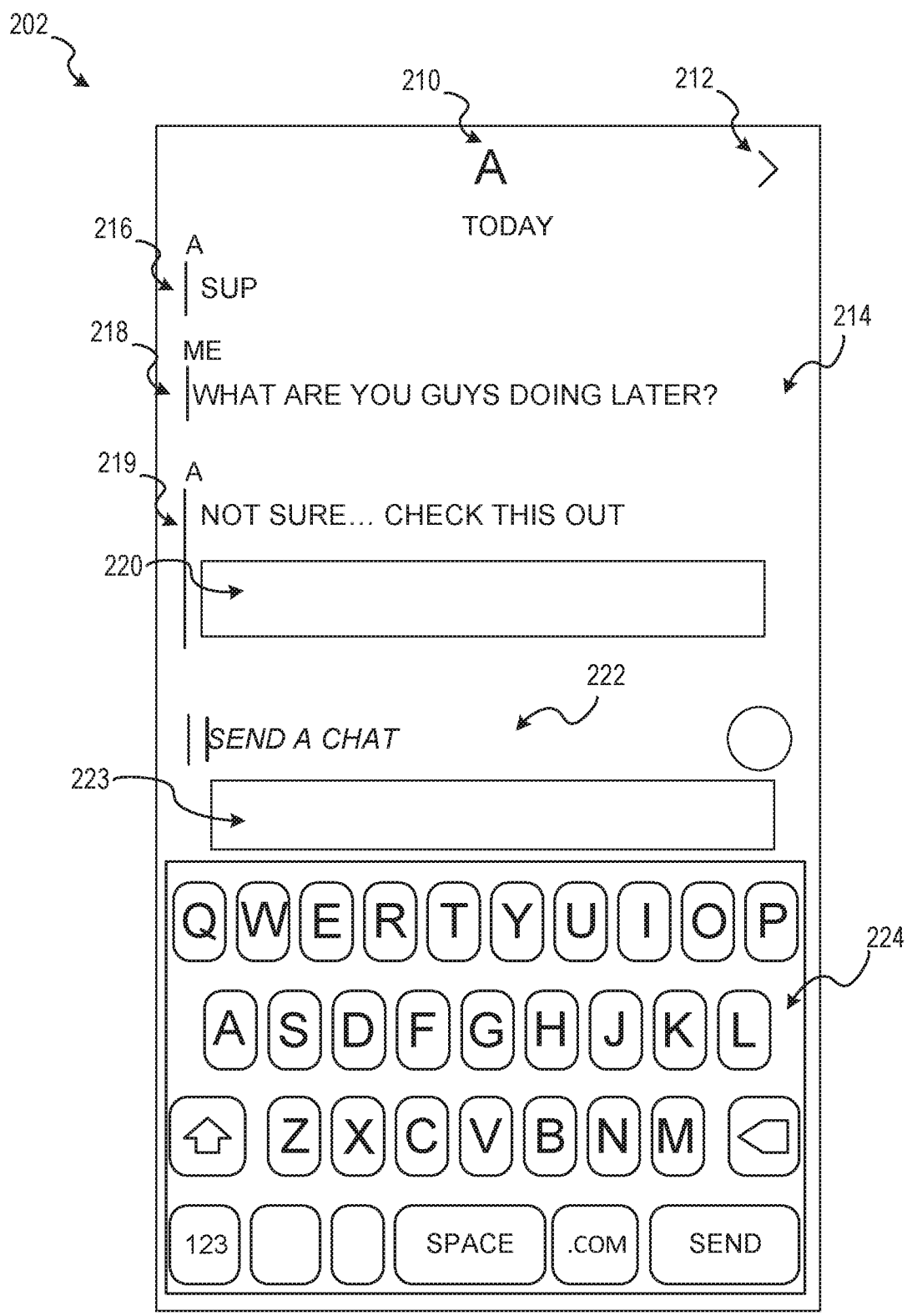
FIGS. 2A-E illustrate aspects of video and/or audio communications within a time-ordered chat interface in accordance with some embodiments.
Figure 8:
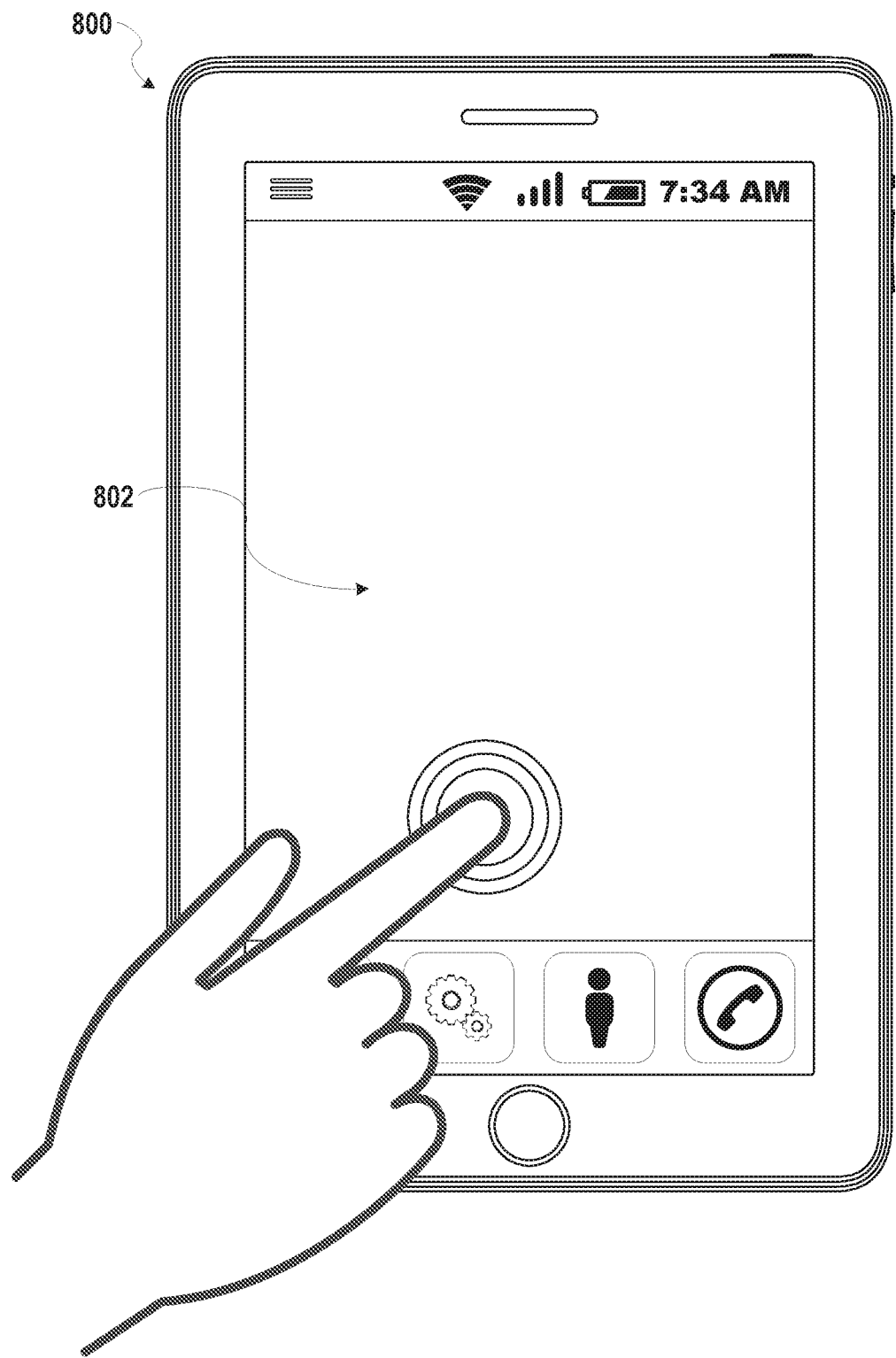
FIG. 8 illustrates an example user interface for a client device operating an application, according to some example embodiments.

FIGS. 2A-E illustrate aspects of chat communications with audio and video elements in accordance with certain example embodiments. FIG. 2A illustrates aspects of a chat view 202 that may be used as part of a messaging client application operating on a client device. This includes client devices such as example client devices 110, 120, and 130 of FIG. 1, and mobile device 800 of FIG. 8, where a chat view 202 may be presented with display area 802 (FIG. 8). Chat view 202 of FIG. 2A includes a header 210 with a chat title next to a top right arrow 212. In some embodiments, interacting with a UI displayed by chat view 202 by tapping the top right arrow 212 button of the interface navigates back to the feed described briefly above. The example embodiment of FIG. 2A with the title in the header 210 shows an identifier of the user account associated with a second device that is exchanging communications with the device displaying chat view 202. Names may be associated with user accounts by the user account controller, or by an individual user (e.g., by assigning names as aliases in a friend list). In other embodiments, other details may be used in a header 210 of a group chat view 202. In some embodiments, tapping a touch target of the user interface (UI) associated with the header 210 reveals a UI dropdown.

Chat view 202 includes chat flow 214. Chat flow 214 is a time-ordered display space of the user interface for a device, with messages displayed in an order based on the time the messages are received at the device displaying chat view 202. Chat flow 214 includes text messages 216, 218, and 219, as well as audiovisual display space 220. Each of these take up one or more rows of display space within chat flow 214.

In some embodiments, rows within chat flow 214 are assigned by text height with a standard pixel value or other height value, while in other embodiments, various rows may have different heights based on an adjustment for content (e.g., text, message icons, video presentations, etc.) being displayed within a particular row or set of rows. Each content message sent or received as part of a chat communication between the first device displaying chat view 202 and a second device associated with the identifier "A" shown in header 210 is assigned one or more lines in chat flow 214, with a message header for consecutive messages associated with the same account (e.g., text message 216 and an additional message associated with audiovisual display space 220 are consecutive messages from the same device, and so share a message header). Chat entry area 222 shows text or other content for a chat message before the message is sent. Data entry interface 224 is a portion of chat view 202 for entering information for an ephemeral chat message, such as the software keyboard illustrated by FIG. 2A. In other embodiments, this may be a voice-to-text interface, or any other such interface for assisting with input for a chat message. In various embodiments, all messages sent via chat view are ephemeral messages, such that each message is associated with a trigger for deleting the message from the device displaying chat view 202, as well as from the server system facilitating the communications. Additional details associated with ephemeral communications are described below.

For embodiments with ephemeral chat messages shown within chat flow 214, other status or presence messages may be displayed. This includes receipt messages, presence notifications, information related to deletion triggers or criteria, or any other such information. For example, a chat interface may also have notifications. These chat notifications, as part of the embodiment with chat flow 214, may include:

Typing
Push
"From [display name] in [group name]"
In App

In other embodiments, other chat notifications may be used. In addition to these notifications for text or content communications, other notifications may be used by a system.

Chat view 202 additionally includes message creation area 223. Message creation area 223 enables generation of audio or video communications to be transmitted to another device from within chat view 202. Additional examples of message creation area 223 are discussed below with respect to FIGS. 5A and 5B.

Figure 2B:
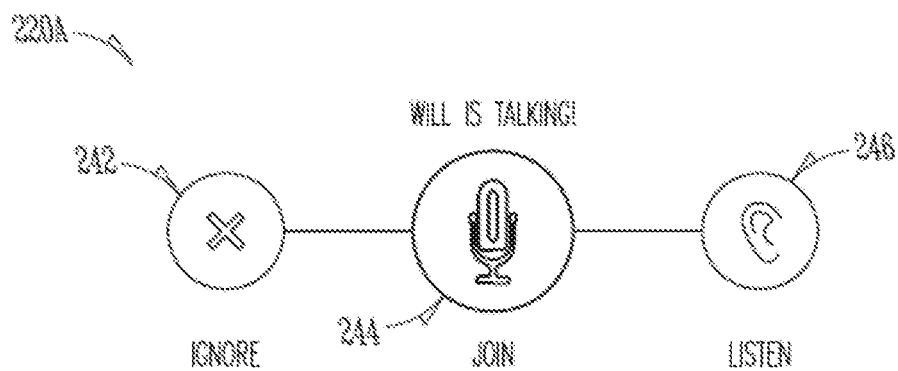
Figure 2C:
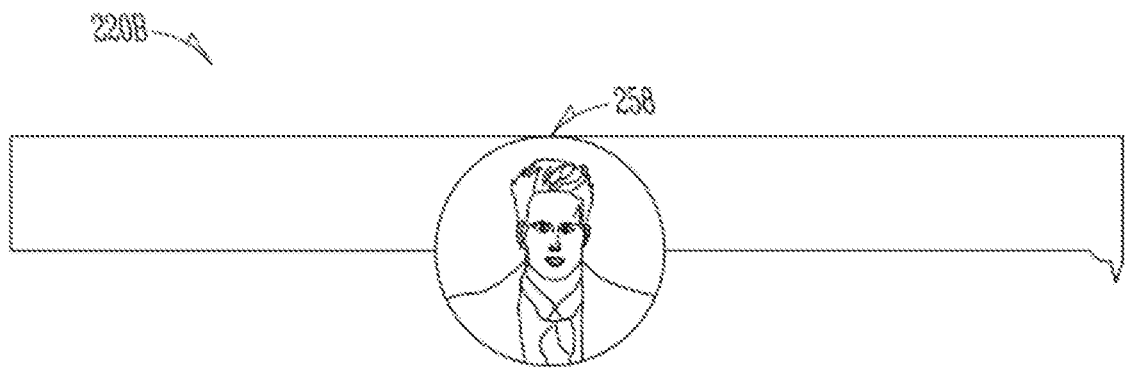
Figure 2C:
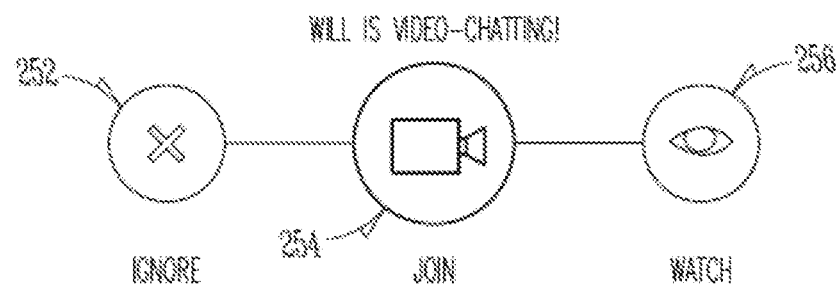

FIGS. 2B and 2C then illustrate aspects of audiovisual display 220A in accordance with different embodiments. As mentioned above herein, audio and video communications may be represented and managed via chat view 202. FIG. 2B illustrates an example interface for presentation within audiovisual display 220A in response to receipt of a notifier indicating that the second device associated with communications presented in chat view 202 is generating streaming audio. When the first device that is displaying chat view 202 receives the audio stream notifier, the device presents response inputs 242, 244, and 246 as part of audiovisual display 220A within a chat flow. When a user input is received at one of the response inputs, the first device manages the streaming data communication from the second device based on the input.

If ignore response input 242 is selected, the first device communicates a message to the second device indicating that the user account associated with the first device has elected to ignore the streaming audio data. If the second device is streaming to multiple users, the second device will continue streaming the audio data, but will not send the audio data to the first device. The second device may present a notification within a chat view of the second device indicating that the account associated with the first device has opted to ignore the streaming audio. In other embodiments, the audio stream notifier is a request to initiate a data stream rather than a notifier that an audio stream exists. For example, the notifier may be a request to establish an audio stream with the first device from the second device. In such an embodiment, the selection of the ignore response input 242 is communicated as a rejection to the second device, and the audio stream is not generated.

If the listen response input 246 is selected, the first device begins receiving the audio stream data from the second device, and outputting the audio on the first device without sending a corresponding audio stream back to the second device. The first device may, however, send a single response or a periodic notifier to the second device indicating that the first device is listening (e.g., receiving and outputting on a speaker) the audio stream from the second device. In response to an input selecting the listen response input 246, the audiovisual display 220A within audiovisual display space 220 may be replaced or modified to reflect the audio being received and output. In other embodiments, the audiovisual display 220A remains, and additional data regarding the received audio stream (e.g., listening time, etc.) are presented in addition to the audiovisual display 220A. This additional information may be presented on the same row or another row within chat flow 214.

If the join response input 244 is selected, the first device communicates with the second device to establish a two-way audio communication with the second device. Just as above, depending on the nature of the audio stream notifier, the first device may simply begin streaming audio data while accepting and outputting streamed audio data from the second device, or the first and second device may jointly establish a two-way audio communication channel. If the audiovisual display 220A remains after any response input is received, the user may select any other response input to adjust the communication with the second device at any time.

FIG. 2C illustrates a similar embodiment of an audiovisual display 220B for display within audiovisual display space 220. Audiovisual display 220B is an example of a set of response inputs for a video stream notifier. Operations of ignore response input 252, join response input 254, and watch response input 256 correspond to the similar response inputs 242-246 of FIG. 2B above. In addition to the response inputs 252-256, audiovisual display 220B includes a video display area 258 for displaying one or more video frames from a video stream associated with video data from the second device. The video data within video display area 258 may be periodically updated, or may display a portion of the video stream data from the second device, until a selection of one of the response inputs is received. FIG. 2C illustrates an example of a chat view element that may appear on a display of a client device such as example client devices 110, 120, and 130 of FIG. 1. The chat illustrates an interface that may be received by a user when a friend engaged in chat initiates video streaming. In response, the user receives an option to ignore the video stream, join the stream for reciprocal video chat, or simply watch the video stream in a one-way chat. This chat may include video and audio, or just video with text chat. FIG. 2B illustrates a similar interface that will be embedded within a chat view for an audio chat request with no video, where users may use audio and text chat within a single interface that is initiated from that interface. As illustrated in FIG. 2A, the chat view 202 includes a header with a chat title next to a top right arrow. If an element such as audiovisual displays 220A or 220B are presented within a chat flow 214, other functionality remains, and tapping the top right arrow button of the interface navigates back to a feed or another view away from the chat view 202.

Figure 2D:
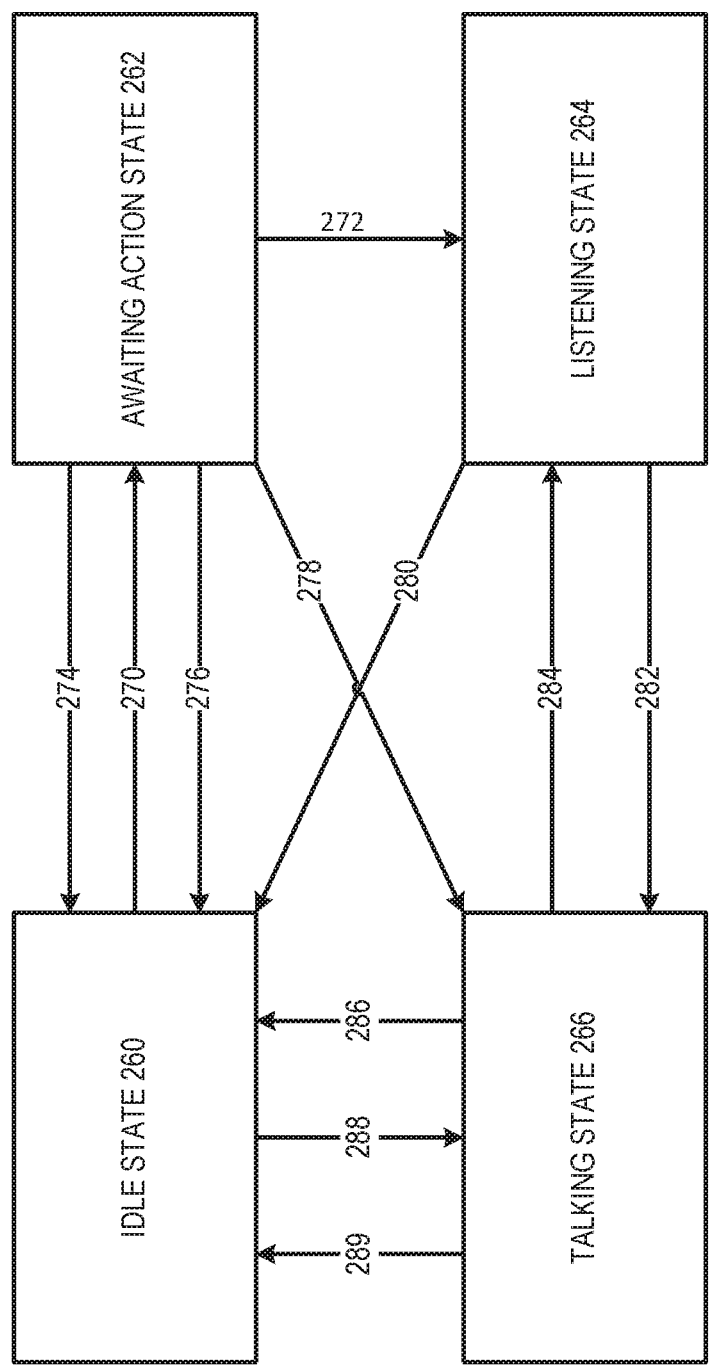

For both audio and video streaming communications, the chat view 202 enables symmetrical communications, asymmetrical communications, or "no talk" states. FIG. 2D illustrates aspects of symmetrical, asymmetric, or no talk operation within a chat environment in accordance with some embodiments with automatic communication management. Such embodiments limit the use of communication bandwidth and may additionally preserve battery power within a device by powering down elements of a device automatically based on various status events.

As illustrated by FIG. 2D, a device may have four states associated with audio or video streaming within a chat flow 214. In other embodiments, other states may be used. In the example of FIG. 2D, when a device is presenting chat view 202 with no associated streaming data, the device is considered to be in idle state 260. When another account or device associated with chat view 202 begins generating a data stream within the context of the chat system, or requests an audio or video connection as part of an operation 270, the first device presenting chat view 202 moves to an awaiting action state 262. If no input is received at the first device and either a notification is received from the second device as part of operation 274 or a threshold amount of time passes without receiving data from the second device as part of operation 274, then the first device returns to idle state 260. Similarly, if an ignore input is received at the first device while in the awaiting action state 262, then the first device communicates notification of the ignore input to the second device and returns to the idle state 260 as part of operation 276.

If the first device receives a "listen" or "watch" input during the awaiting action state 262 indicating that the first device will receive and output data from the second device but will not communicate a corresponding return stream of data from the first device to the second device, then the first device transitions to listening state 264 as part of operation 272. The device may also notify the second device that the first device is entering listening state 264 as part of operation 272.

If the first device receives a "join" input while in the awaiting action state 262, then the first device transitions to the talking state 266, and initiates communications with the second device to establish two-way communications as part of operation 278.

In embodiments associated with FIG. 2D for automatic communication management, after an initial input is received during the awaiting action state 262 to transition to listening state 264 or talking state 266, then the first device begins monitoring audio/video inputs received from a user and received from the second device. In order to conserve power, the first device will automatically transition between the idle state 260, the talking state 266, and a listening state 264. If the second device does not transmit data for a threshold amount of time while the first device is in the listening state 264, then the first device will automatically transition to the idle state 260 in operation 280. As the first device receives input at a microphone or stops receiving microphone input for a threshold amount of time, operations 284 and 282 will alternate between talking state 266 and listening state 264. Similarly, if the second device sends a notification indicating the second device has left chat or the first device stops receiving voice input while the second device has stopped transmitting data for a threshold amount of time, corresponding operations 289 and 286 will transition the first device from talking state 266 to idle state 260. In some embodiments, a partial idle state may maintain a connection with the second device such that if the first device begins receiving voice information at a microphone, the first device will automatically transition from idle state 260 to talking state 266 and begin transmitting audio data to the second device as part of operation 288.

The above operations for the embodiment of FIG. 2D are one potential implementation of automatic management for streaming data within chat view 202. In other embodiments, other management operations may be used to manage streaming communications. For example, in some embodiments, different threshold states may be present for one-way output streaming and one-way input streaming, and different idle states may be set depending on threshold times since the last data communication with a second device. Similarly, with multiple chat views with different friend accounts, a device may be in different states with one or more chat views or communications with other devices at the same time. Similarly, for group chat described below, the states for a first device may be adjusted based on any incoming communication from a server that is managing audio and/or video streaming between multiple devices at the same time for a single group chat.

Figure 2E:
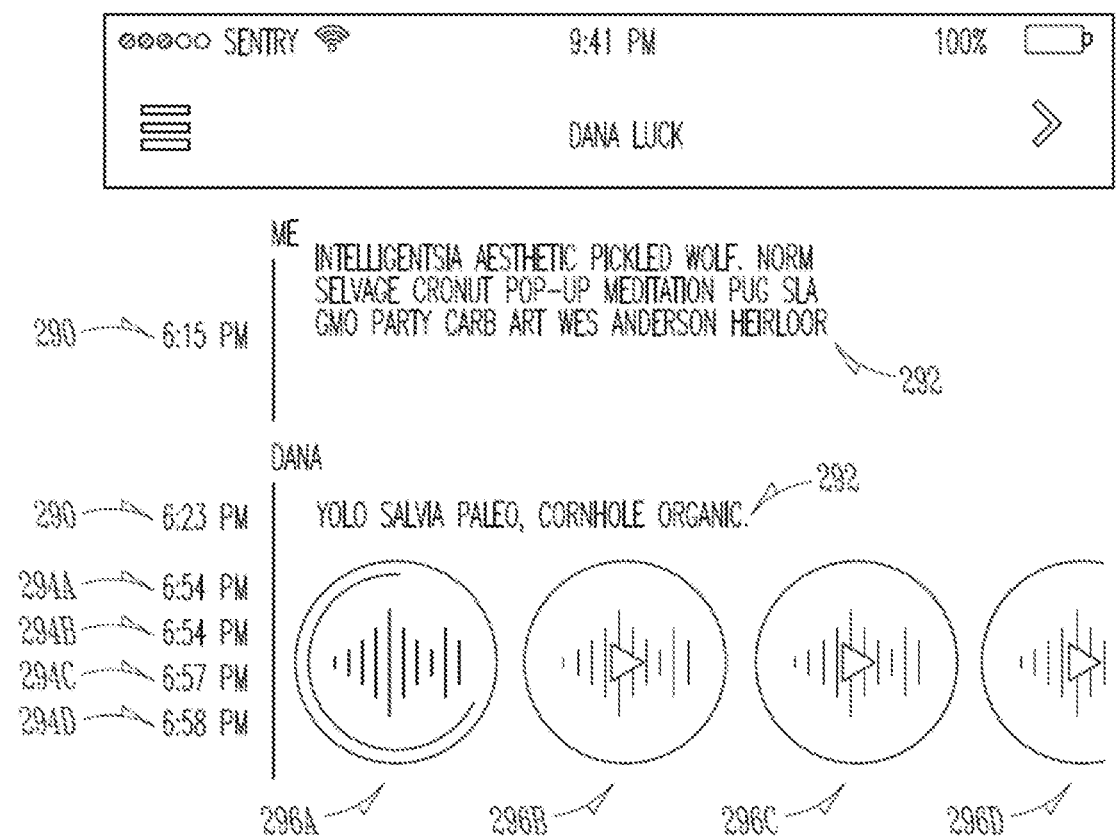

FIG. 2E then illustrates one example embodiment with the interface for video and audio notes or streams, with an example embodiment of multiple received notes along with displayed timestamps. FIG. 2E illustrates text communications 292 along with consecutive times 294A-D. In various embodiments, a user may select to have communications display with timestamps as in FIG. 2E or without timestamps as in chat flow 214 of FIG. 2A.

While FIGS. 2B and 2C illustrate icon interface elements for streaming communications within a chat flow, FIG. 2E illustrates icon interface elements for discrete content communications. In the illustrated example of FIG. 2E, a first device displaying the chat view of FIG. 2E shows a first text communication sent by the first device displaying the chat view, and a second text communication received from a second device at the first device. The associated text messages are shown as text communications 292 received at corresponding times 290. The first device then receives four content communications 296A-D at corresponding times 294A-D. An icon associated with each content communication 296A-D is presented within rows of the chat flow of FIG. 2E. Each icon may be separately selected to begin presentation of the content at the first device (e.g., output audio or output audio along with video presented within the icon area). For video content, an initial selection may begin presentation of the video content within the chat flow area of the chat view. A second selection may shift to a full screen view with an available input command to return to the chat view.

Figure 3A:
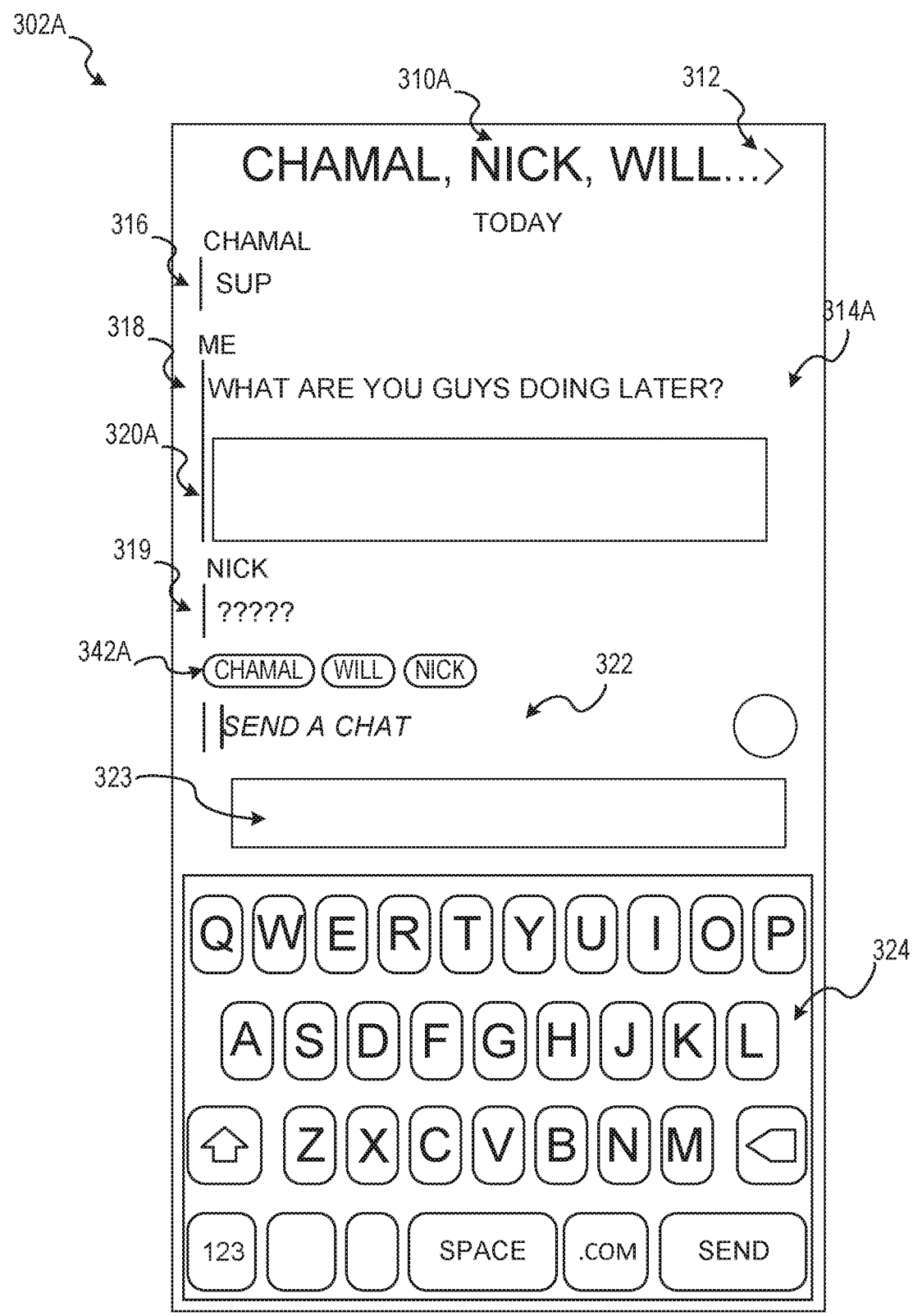
FIGS. 3A-B illustrate aspects of chat communications with additional video or audio elements in accordance with some embodiments.
Figure 3B:
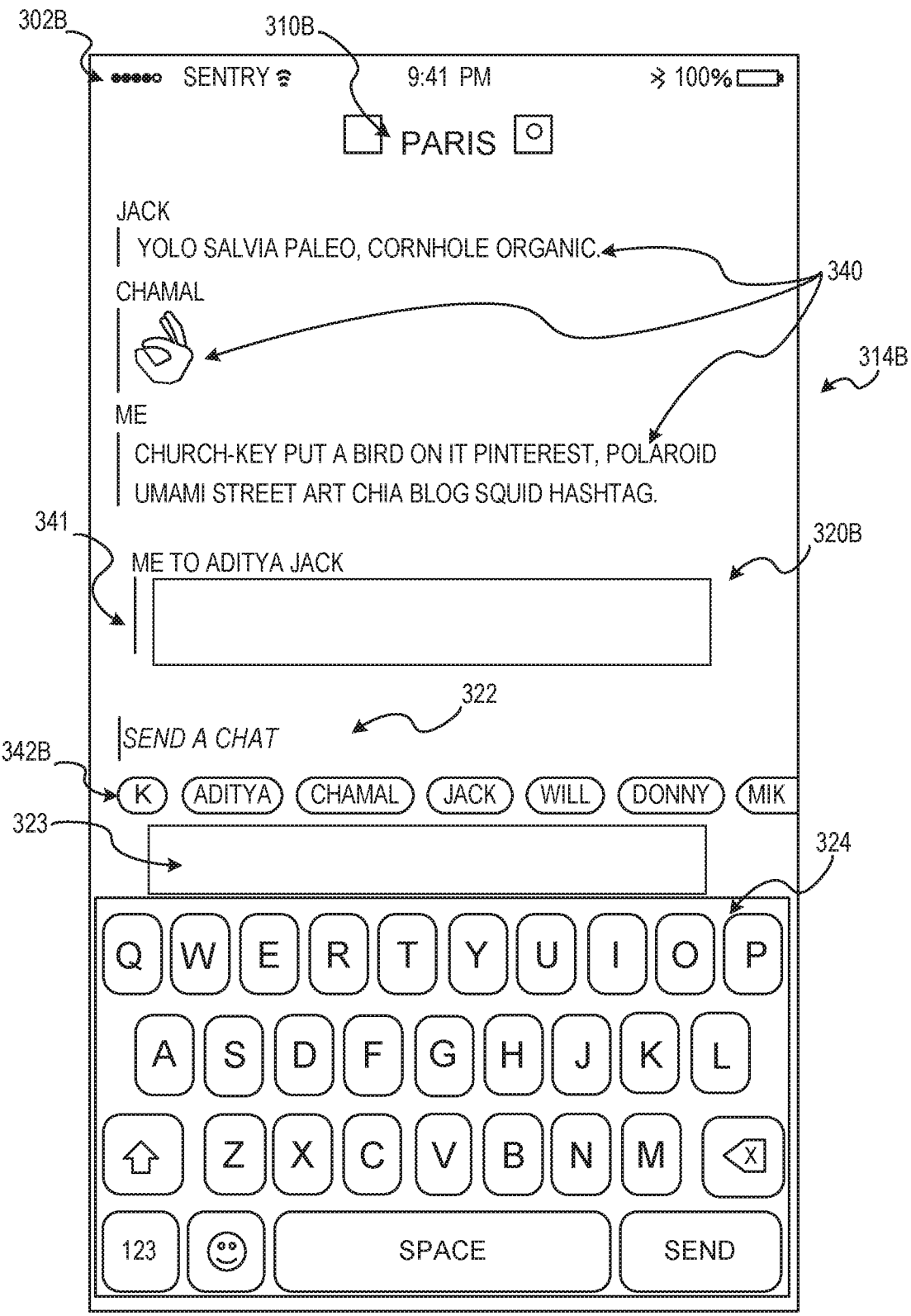

FIGS. 3A and 3B then illustrate an example chat view similar to the chat view of FIG. 2A, but for group chat. Chat view 302A may be used as part of a messaging client application such as messaging client application 1004 operating on a client device for group chat. This includes client devices such as example client devices 110, 120, and 130 of FIG. 1, and mobile device 800 of FIG. 8, where a chat view may be presented with display area 802. Chat view 302A of FIG. 3A includes a header 310A with a chat title next to atop right arrow 312. In some embodiments, interacting with a UI displayed by chat view 302A by tapping the top right arrow 312 button of the interface navigates back to the feed described briefly above. The example embodiment of FIG. 3A with the title in the header 310A shows identifiers of the user accounts associated with a plurality of devices that are exchanging communications with the device displaying chat view 302A. Header 310B is a group name for users identified by user area 342B (FIG. 3B). In other embodiments, other details may be used in a header 310 of a group chat view 302. In some embodiments, tapping a touch target of the user interface (UI) associated with the header 310 reveals a UI dropdown.

In FIG. 3A, chat view 302A includes chat flow 314A. Chat flow 314A is a time-ordered display space of the user interface for a device, with messages displayed in an order based on the time the messages are received at the device displaying chat view 302A, and identifiers within the chat view for an account that generated the message (e.g., text messages, audio or video notes, or audio/video streaming data). Chat flow 314A includes text messages 316, 318, and 319, as well as audiovisual display space 320A. Each of these take up one or more rows of display space within chat flow 314A. In the embodiment of FIG. 3A, audiovisual display space 320A may present one or more icons for audio notes, video notes, or streaming communications sent from the first device to other devices associated with the account identifiers listed in area 342A. Just as above for two account communications, for group communications, in some embodiments, rows within chat flow 314A are assigned by text height with a standard pixel value or other height value, while in other embodiments, various rows may have different heights based on an adjustment for content (e.g., text, message icons, video presentations, etc.) being displayed within a particular row or set of rows. Each content message sent or received as part of a chat communication between the first device displaying chat view 302A and other devices associated with the accounts listed in area 342A are assigned one or more lines in chat flow 314A, with a message header for consecutive messages associated with the same account. Chat entry area 322 shows text or other content for a chat message before the message is sent. Data entry interface 324 is a portion of chat view 302A for entering information for an ephemeral chat message, such as the software keyboard illustrated by FIG. 3A. Message creation area 323 may be used to generate audio or video data for communication to other devices.

FIG. 3B is similar to FIG. 3A, but shows chat view 302B with a descriptive group name in header 310A. Header 310A identifies a group with associated account members listed in area 342B. Chat view 302B shows chat messages 340 within chat flow 314B, but also shows a subgroup communication 341 where an audiovisual message is represented by icons within audiovisual display area 320B. Thus, chat view 302B shows messages not only between all members of the group (e.g., the group associated with header 310A and the accounts listed in area 342B) but also subgroup communications between a subgroup of the overall group.

For embodiments with ephemeral chat messages shown within chat flow 314, other status or presence messages may be displayed. This includes receipt messages, presence notifications, information related to deletion triggers or criteria, or any other such information. For example, a chat interface may also have notifications. These chat notifications, as part of the embodiment with chat flow 314, may include:

Typing
[display name] is typing in [group name] . . .
Push
"From [display name] in [group name]"
In App
"<chat icon>[group name]"
secondary text: "[display name]"

In other embodiments, other chat notifications may be used. In addition to these notifications for text or content communications, other notifications may be used by a system.

If a user changes the group name displayed in header 310A, it is added to the group chat UI and text similar in style to the date text is dropped into the chat:
"[display name] named the group [new group name]"
"You named the group [new group name]"

In some embodiments, renaming the group allows for a group name of 16 characters. Within the dropdown is a list of users' names (e.g., user account identifiers) in the group chat. In some embodiments, each user name is a different group chat color. Tapping the name of a user navigates into a chat with that user. If the user has associated symbols (e.g., emoji, friendmojis, symbol, etc.) they are displayed at the right hand portion of the corresponding cell. At the bottom of the dropdown are options to add a user to the group and to leave the group.

For adding a user to the group, various actions may be used in different implementations. Selecting an add user area of a UI takes a user to a list of friends that are not in the group chat. This may be a communication and response between a client device and a server system (e.g., a friend list is transmitted from the server to the client device), or may use a friend list stored in a client device. When the friend list is displayed, a user can tap multiple names from the friend list to add them to the group. In some embodiments, a maximum group size may be implemented.

A user may also use a UI to leave a group. When leaving a group, a user's saved items are unsaved (and deleted). Unviewed snaps and chats that a user has received are marked as read. Unviewed snaps that a user has sent remain in the chat until they are viewed by each member of the group; then the chat messages disappear from each user's client device. In other words, unviewed chats that a user has sent remain in the chat until they are viewed such that normal clearing logic applies for other users after a group member has left the group.

A message is initially entered at a client device and is sent to devices associated with each user account that is part of a group chat after a user enters a command to send the message. A server system then sends the messages to the appropriate client devices. The devices then maintain the messages, and delete the messages for all users after each user has viewed the chat. In some embodiments, a message may be deleted (e.g., after a deletion period of time) even if it has not been viewed. A message may be considered as having been viewed when the message has been presented on the screen for a certain period of time, when a user has checked the message as viewed, or based on any other such system criteria associated with presentation of a message to a user of a client device. If more than one client device is associated with a single user account, a client device displaying the message may send a message to the server system indicating that the message was viewed, and the server system can send a message indicating that the message is to be deleted at the appropriate time after the message has been viewed by all members of a group chat.

In certain embodiments, any user can save a chat message or all chat messages in a group chat. A visual indicator may be provided on a client device indicating that a user has saved one or more messages or that another member of a group has saved one or more messages in a group chat. One such indicator may be a change in color of a color bar around a user's ID in a presented UI. Another indicator may be a thickness of a line around a user's ID in a presented UI. In certain embodiments, an over-scroll input to a UI will reveal a time stamp with a colored dot of the same color for all users that have saved the content.

In certain embodiments, if a user takes a screenshot, text similar in style to the date text is dropped into the chat with a message "[first name] took a screenshot of Chat!" and "You took a screenshot of Chat!" may be presented on the display of a client device for the user that screen-captured the chat. Such a message may be presented for screenshots taken during group chat as well as screenshots taken on one-to-one chats. In such embodiments, a messaging client application may send a message with presence information to a server computer identifying that a screen capture was taken, and this information is sent to all members of the group chat to be displayed as an update within a chat flow. Similarly, in various embodiments such a messaging client application captures various information about a user's interactions with a user interface and display of chat messages, and sends chat monitoring information to a server computer. The server computer may use this information to determine when chat messages are to be deleted, and when various updated and presence messages are to be displayed via screens of devices.

In various embodiments with a feed or flow interface as described above, messages or content that have previously been viewed by a user appear above a fold in the UI in all devices associated with the user's account. When a content communication (e.g., an image or video clip) is received at a client device as part of a chat and is presented as part of the chat flow, the receiving user can only view the content once. If a receiver screenshots the content, text similar in style to the date text is dropped into a chat of the sender, right below the content as presented to each user in a group chat, indicating that a particular viewer has screen-captured it. This screenshot message is only visible to the sender of the content.

In addition to a screenshot notification to a content communication sender, a sender may additionally receive a receipt indicating that the content was delivered, and a receipt indicating that the content was opened/viewed. For video clips, the notification may indicate if only part of the video clip was viewed. For an image with a time limit on viewing, a receipt may indicate how much of the viewing time has been used. The content received/opened receipt and possible screenshot notification for an individual user disappears after the user has swiped into a chat flow from a higher level UI interface and viewed the associated receipt.

In some embodiments, a sender sees a sent receipt in a chat flow until all people in the group chat have viewed the sent content. The sent receipt provides an "opened" notification when one or more other recipient users have viewed the content. In certain embodiments, a sender can view who has seen the content by pulling right to left on a touchscreen UI to reveal a list of the content read receipts for all other users in a group. In one example implementation such content read receipts are indicated by a colored dot, where the color corresponds with the color of the user who has viewed the content. After all users have viewed the content, the read receipt remains until the sender has seen the chat view in the state where all receivers have viewed the content. After the sender enters the chat when the content has been viewed by all other group members, the receipt is released.

In one example embodiment, the sender can see who has taken a screenshot via text similar in style to the date text directly under the content receipt. For example:
"[first name] took a screenshot!"
or if multiple people took a screenshot:
"[first name], [first name], [first name], & [first name] took a screenshot!"

The screenshot text is released along with a content_sent_opened icon. When a user enters or leaves a chat group, an indicator message is shown in the same style as the date headers illustrated above (e.g., "today"). Example indicator messages include:
[first name] has left
and
[first name] was added by [first name of adder].

In such an embodiment, the indicator message text follows chat read logic for being released and removed from a chat flow and client device. When a user leaves a chat, for example by selecting a leave chat interface, the chat messages on devices associated with that user account are unsaved (e.g., deleted for all associated user devices when possible, such as after connection with the server computer after power-on or after running a messaging client application on a device that had previously received an ephemeral chat message). In some embodiments, such a leave chat interface includes additional warnings that chat messages will be inaccessible to the user account after leaving the group chat, but will be available to other users. Unviewed snaps and chats that the leaving user has received are marked as read for the purpose of any deletion triggers associated with the leaving user account. Unviewed chat messages that the user has sent remain in the chat flows of other users' devices until they meet deletion criteria, then disappear from the chat flows of all users.

Chat views 302A and 302B each additionally include message creation area 323. Message creation area 323 enables generation of audio or video communications to be transmitted to another device from within chat view 302A, 302B. Additional examples of message creation area 323 are discussed below with respect to FIGS. 5A and 5B.

The title in the header 310A shows the first names or identifiers of the users in the group chat. If there are too many names, the first few names are shown followed by an ellipsis. The ordering of the names may be dictated by the order of joining the group, or in any other order allowed by the system. In some embodiments, tapping a touch target of the user interface (UI) associated with the names reveals a UI dropdown. For systems with group chat, multiple names or account identifiers may be displayed in such a header.

Presence indicators (e.g. colors or highlighting of account identifiers or names) in area 342 lists group members, and may include indicators as to which group members are currently in a chat view 302 for the shared group chat on devices associated with user accounts corresponding to the presented names or user account names shown by the presence indicators. In some embodiments, for example, colors associated with a user account may brighten or be displayed when a chat system has received presence information from a user device associated with a user account within a certain time frame indicating that the user is displaying or interacting with chat view 302. When the chat system has not received a presence communication within a certain time frame, a name or account identifier of presence indicators 342 may indicate this as well (e.g., by greying out the associated name or account identifier).

For example, certain notifications may be provided for users joining or leaving a group. Additionally, some embodiments may enable a user to block communications from another specific user or group of users. Notifications may be provided when a user is initially blocked, and notifications may be provided when communications are not received because a user has previously blocked a user sending a current message. Specific details of such notifications may vary between different implementations, and may be selectable and customizable by different users.

In addition to allowing group chat within a UI of chat view 302, certain embodiments may enable chat between only a portion of members of a group within the same chat flow, as illustrated by FIG. 3B. Thus, certain embodiments include systems and methods for a user taking part in a group chat to have a private conversation with one or more of the members of the group without the knowledge of the rest of the group. Such embodiments include the private messages appearing independently of the group conversation of chat flow 314. In certain embodiments, a user can "scroll" within the private conversation and the group conversation independently within chat flow 314 even if they are both on the main or only display. For example, in such embodiments, if a private chat flow within chat flow 314 exceeds a certain size, number of messages, or number of lines, a scrollable interface within chat flow 314 is presented. If the overall chat flow 314 is similarly larger than a threshold size that fits within chat flow 314, then a user may scroll messages within chat flow 314, and may also scroll within a sub-area that presents only a portion of the private group chat messages represented by private or subgroup chat as illustrated by subgroup communication.

In the embodiment illustrated by FIG. 3B, the chat messages 340 shown as beginning at the left margins are messages shared with all of the members of the group. During group chat, a user can select one or more members of the group for a subgroup communication, such as a private group chat 341 message, and that private "whisper" message will be sent only to those selected group members. The private group chat 341 message is displayed as part of the group message flow in chat view 302B, but with an indent to show that the private group chat 341 message is not shared with the entire group. Such a private group chat 341 whisper message may be initiated by, for example, touching the names of recipients in the display (e.g., in area 342B) to add them to a whisper subgroup. In some embodiments, if messages between the subgroup exceed a certain length, then another sub-flow may be embedded within chat flow 314B for the messages between members of the subgroup.

Additionally, in certain embodiments an independent scroll area for the private whisper communications may be included. For example, in the embodiment of FIG. 3B, if a user swipes up or down in the area below the "ME TO ADITYA JACK" header and above the "SEND A CHAT" area, the message display for the private whisper message history will scroll up and down if there are more messages than fit in the display area (e.g. audiovisual display area 320B), while the group messages are stationary. In other embodiments, where a group message is presented below the private whisper message area, the user interface swipe area may be in the area where text for the private whisper message is presented. If multiple different private whisper messages are part of the same user interface display, these may each have separate whisper display areas. For such an embodiment, each separate area will scroll to a history of their separate independent whisper messages if a swipe input is received at the user interface.

Thus, as described above, a user can have a combination of two or more group chats or private conversations open on the same screen. Embodiments with such a single screen may have multiple layers of privacy (e.g., a group chat with six people, a private conversation with four of the six, and another private conversation between two of those four).

Figure 4:
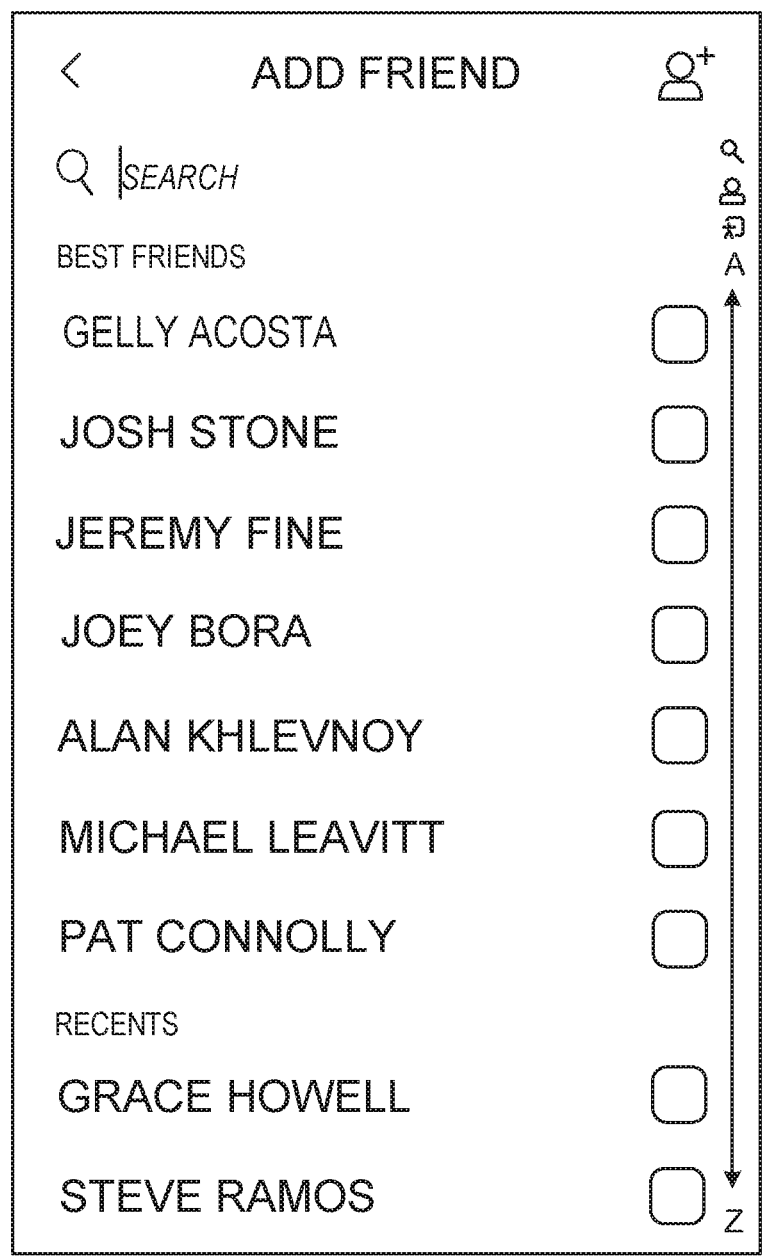
FIG. 4 illustrates aspects of chat with embedded notes in accordance with some embodiments.

FIG. 4 illustrates additional aspects of chat in accordance with certain example embodiments. FIG. 4 illustrates an example UI, shown as display 400, for selecting an account (e.g., a friend) to initiate a chat view (e.g., chat view 202) or for adding a friend to a chat group (e.g., chat view 302). If a user selects the add friend interface, the user is taken to a list of friends which has previously been established for the user. The user can tap on multiple names in the UI to add them to the group. This interaction is the same as the send-to page for a single content message communication in various embodiments. After the user presses "Done," the friends selected are added to the group. A user cannot add more friends to the group if the group is at its maximum size as defined by a system threshold.

In some embodiments, if a group reaches the maximum limit threshold while adding friends in the Add Friend page, the checkboxes disappear and the names dim to 50% opacity. If a user unchecks one of the friends that have been selected, the checkboxes reappear When a user joins a chat, for example by selecting an add friend interface, different embodiments may manage the availability of chat messages to the joining user in different ways. In some embodiments, chat messages that have not been deleted and that were sent to all previous group members are made available to the joining user, and associated deletion triggers are modified to add the joining user to any deletion criteria associated with all group members (e.g., deletion after all group members view the chat message for 10 seconds). In some embodiments, however, the newly added member does not receive any previously sent chat messages. In such embodiments, the previously sent chat messages may maintain the same presentation within the chat flow of previous members, or the previous messages may be presented within a sub-chat interface such as the one described above (e.g., private group chat 341), with subsequent messages to the entire group presented in the main chat flow to all group members.

In certain embodiments, a system selects a user identifier for use in chat messages in different ways. In some embodiments, the system uses a first name of the user as identified from registration information. The first name is assumed to be the string that exists before the first space in a name field of account name data. In other embodiments, the first name may be derived or discovered in other ways. If there are multiple users in a group that have the same first name, the system will use the last name's (e.g., string that exists after the last space) initial, and will use additional characters until a unique identifier for the group is presented. In some embodiments, if there are conflicts with using the last initial, the system can use the whole last name, and a unique character or number may be generated by the system if additional conflicts remain.

If one name is Bob Smith and there is a Bob Jones in a group, Bob Smith will see Bob and Bob Jones will see Bob Smith as Bob. Everyone else in the group will see Bob S. and Bob J.

In addition to the management of ephemeral messages, in some embodiments a system interface may also indicate presence information, which provides group members information about which users are currently or have recently (e.g., within a threshold time period) accessed the group chat flow or messages from a group chat. This presence information is provided by a visual affordance to indicate who is present in the group with their first names in an unfilled bubble of their group chat color. These bubbles appear starting on the left side above the chat input bar, and appear on the right side as users enter the group.

Figure 5A:
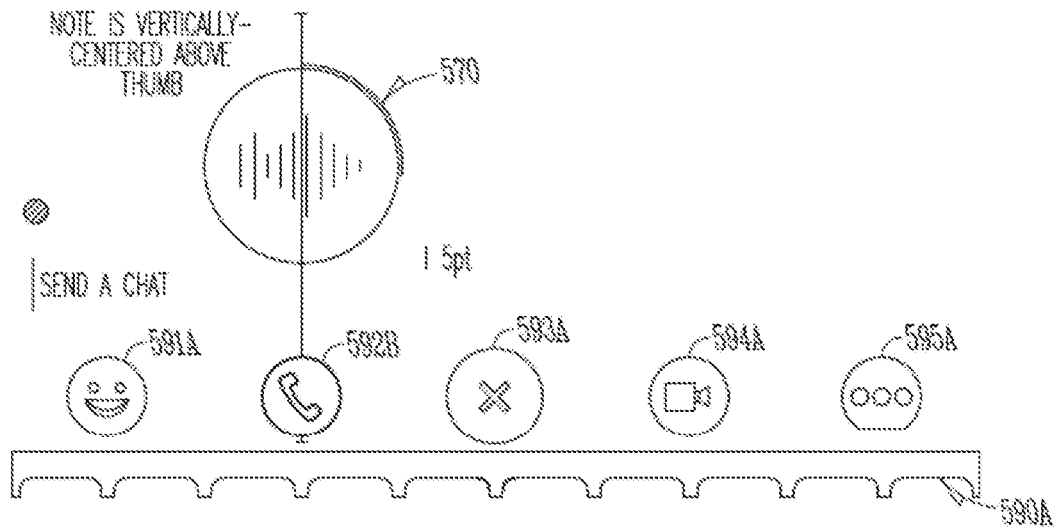
FIGS. 5A-B illustrate aspects of generating embedded notes for use within a chat interface in accordance with some embodiments.
Figure 5B:
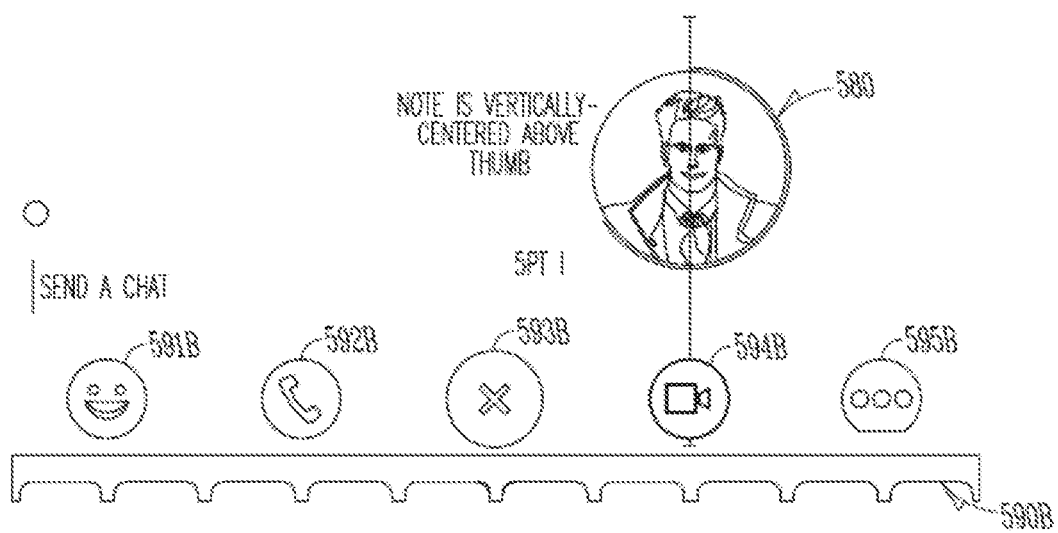

FIGS. 5A and 5B then illustrate aspects of one embodiment of a system for generating audio and video notes in accordance with some embodiments. FIGS. 5A-B each illustrate an example interface 590 which may, for example, be presented in a chat view such as in message creation area 223 of chat view 202 or message creation area 323 of chat view 302. Interface 590A in FIG. 5A includes an emoji interface 591A for accessing an emoji input area (e.g., similar to data entry interface 224 with emoji in place of letters). Interface 590A further includes audio message generation input 592A, delete draft message command area 593A, video message generation input 594A, and additional operation input 595A. FIG. 5A illustrates interface 590A with corresponding elements 591A-595A, where audio message generation input 592A is selected. As an input is received at audio message generation input 592A, an audio message icon 570 is generated above a position in the interface 590A (e.g., chat view) above where the input 592A is received. The audio message icon 570 may represent a recorded audio note prior to the audio note being communicated to other devices. In one embodiment, pressing a touch screen in an area associated with audio message generation input 592A begins recording of an audio note, and removing (e.g., releasing contact) from the area associated with audio message generation input 592A ends recording of the note. Selection of the audio message icon 570 may allow a message to be reviewed before communication to other users. Selection of audio message generation input 592A a second time after recording the audio not may transmit a content message with the audio note and make the audio unavailable in a chat view for other users. Selecting delete draft message command area 593A after recording the audio message but before sending the audio message will delete the recorded message.

FIG. 5B illustrates similar operations for video message generation input 594B. FIG. 5B includes interface 590B, which may be used within a chat view in accordance with various embodiments (e.g., message creation area 223 of FIG. 2 for two person chat or message creation area 323 for group chat). Interface 590B includes elements 591B-595B, similar to interface 590A of FIG. 5A. When video message generation input 594B is selected, a video note begins recording, with at least a portion of the recorded video note displayed in video message display area 580. When video message generation input 594B is released, the recording of the video message ends. A user may then select area 580 to review the video message. This selection may generate an audio output along with display of video content within area 580. In other embodiments, such a selection may switch to a full screen mode for display of the video message before returning to a chat view with the icon for the video note in area 580 (e.g., an area above video message generation input 594B). When a user either deletes or sends the video note, the icon within area 580 is removed from the chat interface. While the icon is displayed, it may be presented over the top of any items within a chat view or chat flow.

While particular operations are described above for generation of audio and video notes, it will be apparent that in other embodiments, other systems for generating messages may be used. Additionally, operations similar to those described above for audio and video notes with respect to FIGS. 5A-B may be used to generate or initiate streaming audio or video communications via a chat view in accordance with embodiments described herein.

The secondary media element of the interface (e.g., an icon for audio or video) may be a small bubble where video or an audio waveform is presented. For example, such secondary media elements are shown in FIG. 2E for elements 296A-D. For calling (or incoming video or audio data streams), a prompt may appear when another party attempts to send streaming video and audio information as in FIGS. 2B-C. Such a prompt may be collapsed in some embodiments after a response is received. The text chat remains in the upper portion of the screen, with the secondary media presented between a text and a keyboard area (e.g., of a touchscreen interface). Any such audio or video data may thus be presented within a secondary media element in one or more rows of a chat view. A user interface input allows alternating between a full screen view and a secondary media element view within rows of the chat flow in various embodiments. For example, if content communication 296B is associated with a video note, the video display may be presented entirely within a circle shown for content communication 296B within the chat flow, with the video automatically cropped by the system to fit within the secondary media element. Such cropping may be available for review within the interface of a user generating the video content (e.g., area 580 of FIG. 5B).

In some embodiments, a chat message may be deleted (i.e., after a deletion period of time) even if it has not been viewed. A message may be considered as having been viewed when the message has been presented on the screen for a certain period of time, when a user has checked the message as viewed, or based on any other such system criteria associated with presentation of a message to a user of a client device. If more than one client device is associated with a single user account, a client device displaying the message may send a message to the server system indicating that the message was viewed, and the server system can send a message indicating that the message should be deleted at the appropriate time after the message has been viewed by a chat recipient.

In certain embodiments, any user can save a chat message or all chat messages. A visual indicator may be provided on a client device indicating that a user has saved one or more messages or that another member of a group has saved one or more messages in a group chat. One such indicator may be a change in color of a color bar around a user's ID in a presented UI. Another indicator may be a thickness of a line around a user's ID in a presented UI. In certain embodiments, an over-scroll input to a UI will reveal a time stamp with a colored dot of the same color for all users that have saved the content.

In certain embodiments, if a user takes a screenshot, text similar in style to the date text is dropped into the chat. A message "[first name] took a screenshot of Chat!" and "You took a screenshot of Chat!" may be presented on the display of a client device for the user that screen-captured the chat. Such a message may be presented for screenshots taken during group chat as well as screenshots taken during one-to-one chats.

When a content communication (e.g., an image or video clip) is received at a client device as part of a chat and is presented as part of the chat flow, the receiving user can only view the content once.

If a receiver screenshots the content, text similar in style to the date text is dropped into a chat of the sender, right below the content as presented to each user in a group chat, indicating that a particular viewer has screen-captured it. This screenshot message is only visible to the sender of the content.

In addition to a screenshot notification to a content communication sender, a sender may additionally receive a receipt indicating that the content was delivered, and a receipt indicating that the content was opened/viewed. For video clips, the notification may indicate whether only part of the video clip was viewed. For an image with a time limit on viewing, a receipt may indicate how much of the viewing time has been used. The content received/opened receipt and possible screenshot notification for an individual user disappears after the user has swiped into a chat flow from a higher-level UI interface and viewed the associated receipt.

Figure 6:
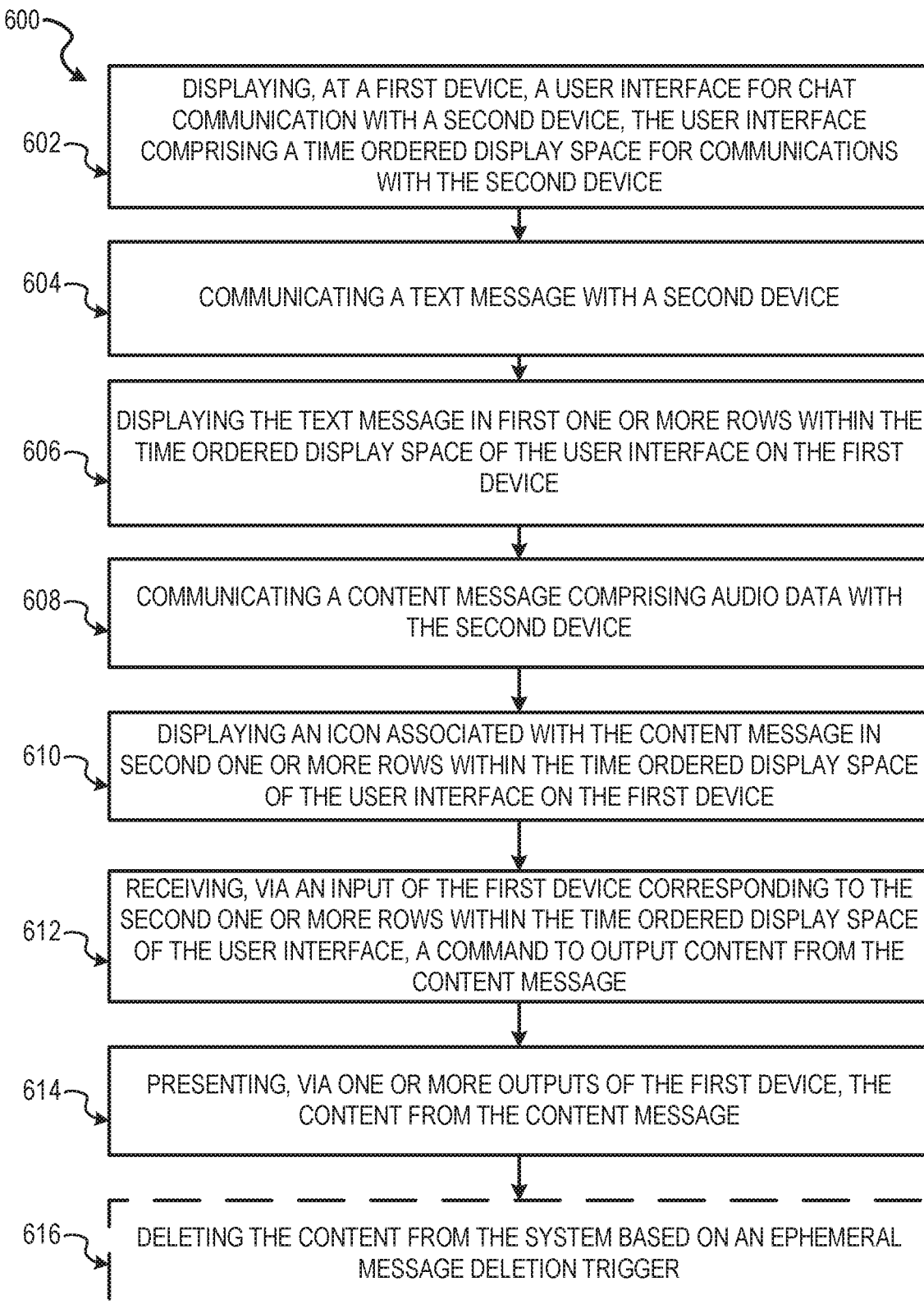
FIG. 6 illustrates aspects of chat with embedded notes in accordance with some embodiments.

FIG. 6 then illustrates an example embodiment of a method for chat with audio or video elements in accordance with embodiments described herein. Some embodiments of method 600 are implemented as a device comprising memory and one or more processors configured to perform the operations of method 600. Some embodiments of method 600 are implemented as a computer-readable storage media or non-transitory computer-readable medium comprising instructions that, when executed by one or more processors of a device, cause the device to perform method 600.

Method 600 begins with operation 602, which involves displaying, at a first device, a user interface for chat communication with a second device, the user interface comprising a time-ordered display space for communications with the second device. Then operation 604 involves communicating a text message with a second device. Such a communication may either be from the first device or to the first device from the second device. The first device then displays the text message in first one or more rows within the time-ordered display space of the user interface on the first device in operation 606. Such a display may include a time indicator for when the communication associated with the message is sent or received. Such a display may additionally include one or more headers identifying the source of the message. Operation 608 then involves communicating a content message comprising audio data with the second device, and operation 610 involves displaying an icon associated with the content message in second one or more rows within the time-ordered display space of the user interface on the first device.

A command is then received at the first device in operation 612 to output content from the content message. Such a command may be received via an input of the first device corresponding to the second one or more rows within the time-ordered display space of the user interface. In response to the command of operation 612, the first device presents, via one or more outputs of the first device, the content from the content message in operation 614. Then, in embodiments that operate with ephemeral communications, the system deletes the content from the system based on an ephemeral message deletion trigger in operation 616. For group communications, the deletion trigger may be managed by the server system verifying that communications have been accessed by all group members or that a threshold time has passed, whichever occurs sooner. The server system may then communicate with all devices that received the ephemeral messages to verify deletion of the content for the ephemeral message. For chat between two accounts, the deletion of the content may be managed by the devices associated with the accounts, or may be managed and verified by the server system in various embodiments.

As described above, various embodiments may include content messages that include audio "notes", video "notes" (e.g., video with audio), streaming audio, and streaming video. Content messages for a system of chat communications thus may include any combination of such content messages in various embodiments. Thus, some additional methods may operate with elements in addition to those of method 600 described above.

One additional embodiment involves receiving, at the first device prior to communication of the content message, an audio stream notifier associated with the second device; and displaying, in the second one or more rows within the time-ordered display space of the user interface, one or more response inputs associated with the audio stream notifier. In such an embodiment, the content message comprises a stream of audio data from the second device.

Another such embodiment operates where the one or more response inputs comprise at least a listen-only input, a join input, and an ignore input. Another embodiment involves receiving, via the input of the first device, a selection of the join input, and in response to the selection of the join input and receipt of the audio stream notifier, establishing a two-way data stream between the first device and the second device.

Still further embodiments may operate by sensing data from a microphone of the first device, and automatically adjusting, in response to the data from the first device, an audio connection between an idle state, a talking state, and a listening state based on the data from the microphone and the stream of audio data from the second device.

Additional such embodiments may include operations to display a plurality of identifiers comprising an identifier associated with the second device, where the audio stream notifier is associated with audio data from a plurality of devices associated with the plurality of identifiers, and where the content message is received at the first device via a server computer.

Some embodiments with ephemeral communications operate by monitoring an ephemeral message deletion trigger associated with the content message, deleting the content message from the first device when a threshold associated with the ephemeral message deletion trigger has been met, and communicating, to the server computer, a deletion notification message. Deletion triggers may thus be managed either by a local device or by the server system in various embodiments. In one embodiment, a deletion trigger is a time since a content message associated with the ephemeral message content is sent or received. In another embodiment, a deletion trigger is a total time the content is displayed on an output of a device (e.g., display of a photo for 10 seconds). In some embodiments, a deletion trigger is a number of times a piece of content has been completely or partially displayed, or a number of times a receiver has elected to begin display of content (e.g., display of a video two times). In some embodiments, any combinations of such deletion triggers may be used.

Messages may be recorded for transmission and presentation within a chat view in some embodiments by receiving, at the first device prior to communication of the content message, a video stream notifier associated with the second device. In some such embodiments, the icon comprises a portion of at least a first video frame from a stream of video data, the content message comprises the stream of video data from the second device, and presenting the content from the content message comprises displaying video data from the stream of video data in the second one or more rows within the time-ordered display space of the user interface.

Some embodiments enable a device presenting a chat view to switch between audio and video communications with a second device or a group of devices from within a chat view. Some such embodiments operate by receiving, at the first device, an input to switch from a video communication to an audio only communication; transmitting, by the first device to a server system, a notification of the switch from the video communication from the audio only communication; in response to the notification, receiving, from the server computer, a stream of audio data associated with the stream of video data; and adjusting the presenting of the content from the content message from the displaying of the video data from the stream of video data to an audio only output associated with an audio icon in the second one or more rows within the time-ordered display space of the user interface.

In some embodiments, the content message comprises an audio file, and presenting the content from the content message, via the one or more outputs of the first device, comprises outputting audio from the audio file via a speaker of the first device.

Other embodiments operate where a content message comprises a video clip and presenting the content from the content message, via the one or more outputs of the first device, comprises outputting audio from the video file via a speaker of the first device and displaying video frames from the video file within a first circular area of the second one or more rows within the time-ordered display space of the user interface.

For systems that allow each device to manage ephemeral content deletion, such embodiments may operate by monitoring an ephemeral message deletion trigger associated with the content message and deleting a video clip from the first device when a threshold associated with the ephemeral message deletion trigger has been met.

For any embodiments, a user may generate content at a device for transmission to another device using a chat view by receiving, at a record input area of the user interface, an input to initiate recording of a second content message; generating, by the first device in response to the input, second content; displaying, within third one or more rows within the user interface, a message icon associated with the second content; and transmitting the second content and the message icon to the second device for display of the message icon in a second user interface of the second device.

In any of the various embodiments described above, operations from different embodiments may be performed repeatedly, performed with operations of other embodiments, or performed with other intervening operations in accordance with the innovations described herein. Thus, while method 600 describes operations in a particular order, and additional operations are described, other embodiments may include any such operations performed in different functional orders in accordance with the described chat systems.

Figure 7:
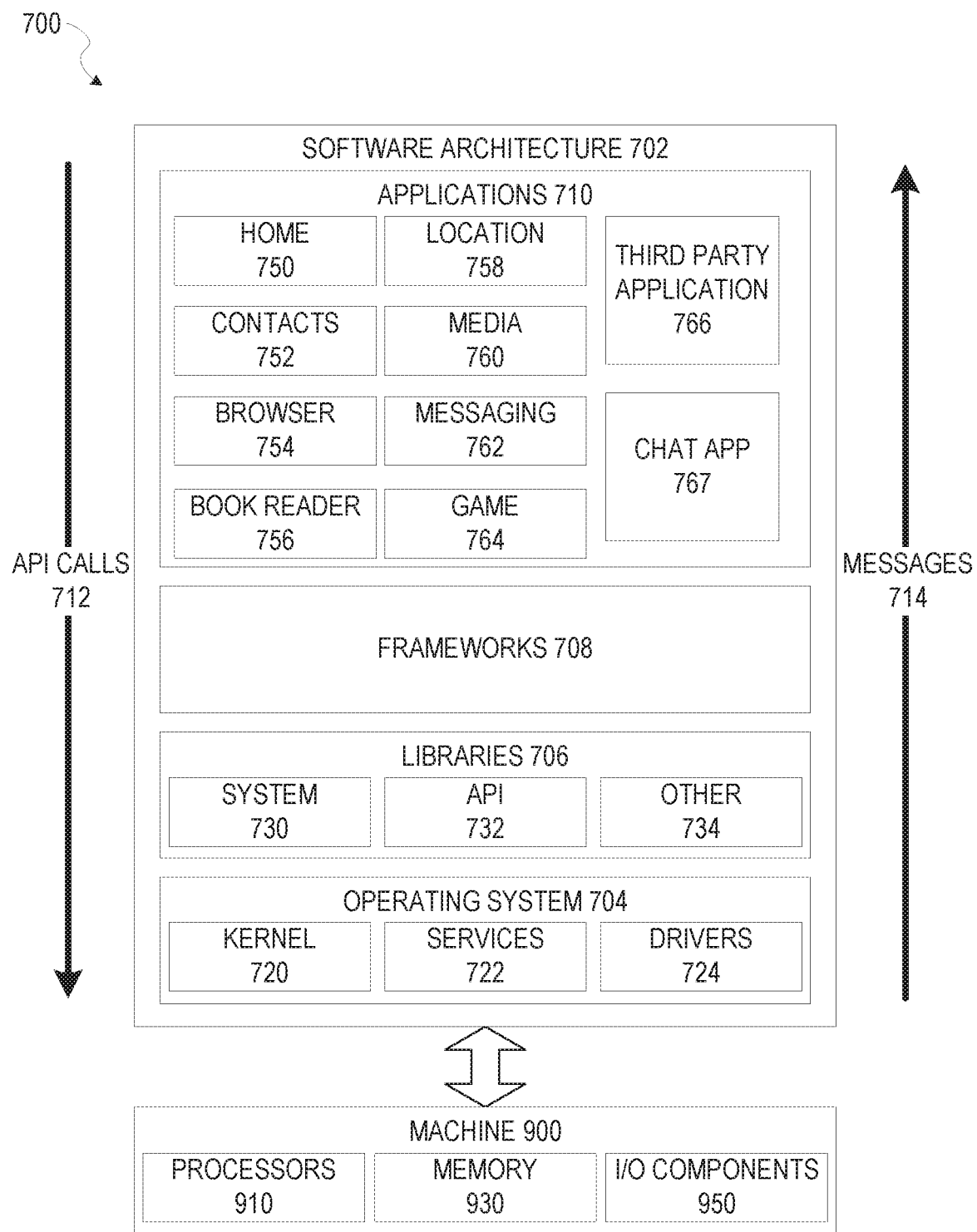
FIG. 7 is a block diagram illustrating an example of a software architecture that may be installed on a machine, according to some example embodiments.

FIG. 7 is a block diagram 700 illustrating an architecture of software 702, which can be installed on any one or more of the devices described above. For example, in various embodiments, client devices 110, 120, 130 and server system 150 may be implemented using some or all of the elements of software 702 to enable ephemeral group chat and associated content communications. FIG. 7 is merely a non-limiting example of a software architecture, and it will be appreciated that many other architectures can be implemented to facilitate the functionality described herein. In various embodiments, the software 702 is implemented by hardware such as machine 900 of FIG. 9 that includes processors 910, memory 930, and I/O components 950. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third-party application 766 can invoke the API calls 712 provided by the operating system 704 to facilitate functionality described herein.

Some embodiments may particularly include a chat application 767. In certain embodiments, this may be a stand-alone application that operates to manage communications with a server system such as server system 150. A chat application 767 may include implementations for multiple user interfaces, including a top level flow interface that presents cells for different user chat or group chats and content communications, as well as system settings, individual group chat message flows, or any other interface material, such as the example interfaces presented in FIGS. 2-5. Chat application 767 may also manage automatic deletion of chat messages and other content message information as defined by system operation for ephemeral communications described above, where text messages in a group chat are automatically deleted following viewing by all group users. In other embodiments, this functionality may be integrated with another application such as a social media application 760 or another such application. In some embodiments, chat application 767 may manage collection of content using a camera device of machine 900, communication with a server system via I/O components 950, and receipt and storage of received messages in memory 930 as part of communication of content messages. Presentation of messages and associated content may be managed by chat application 767 using different frameworks 708, library 706 elements, or operating system 704 elements operating on a machine 900.

FIG. 8 illustrates an example mobile device 800 executing a mobile operating system (e.g., IOS™ ANDROID™, WINDOWS® Phone, or other mobile operating systems), consistent with some embodiments. Mobile device 800 may implement software 702 in certain embodiments. In one embodiment, the mobile device 800 includes a touch screen operable to receive tactile data from a user. FIG. 8 may show text messages and associated content in a display area 802. The user may physically touch the mobile device 800, and in response to the touch, the mobile device 800 may determine tactile data such as touch location, touch force, or gesture motion. In various example embodiments, the mobile device 800 displays a home screen operable to launch applications 710 or otherwise manage various aspects of the mobile device 800. In some example embodiments, the home screen provides status information such as battery life, connectivity, or other hardware statuses. The user can activate user interface elements by touching an area occupied by a respective user interface element. In this manner, the user interacts with the applications 710 of the mobile device 800. For example, touching the area occupied by a particular icon included in the home screen causes launching of an application 710 corresponding to the particular icon.

In certain embodiments, content may be presented within the touch screen of mobile device 800 operating as a client device, such as client devices 110, 120, 130, and a touch input may be used to initiate a communication to a server system as part of a chat system involving embedded video and/or audio elements.

Many varieties of applications 710 (also referred to as "apps") can be executing on the mobile device 800, such as native applications (e.g., applications programmed in Objective-C, Swift, or another suitable language running on IOS™, or applications 710 programmed in Java running on ANDROID™), mobile web applications (e.g., applications 710 written in Hypertext Markup Language-5 (HTML5)), or hybrid applications (e.g., a native shell application 710 that launches an HTML5 session). For example, the mobile device 800 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 800 includes a social messaging app such as SNAPCHAT® that, consistent with some embodiments, allows users to send public content to a server system (e.g., server system 150 or 1008), and to receive messages from the server system. Such a SNAPCHAT application 710 may additionally enable exchange of various ephemeral image, audio, and/or video content messages for display as part of chat communications described herein.

Figure 9:
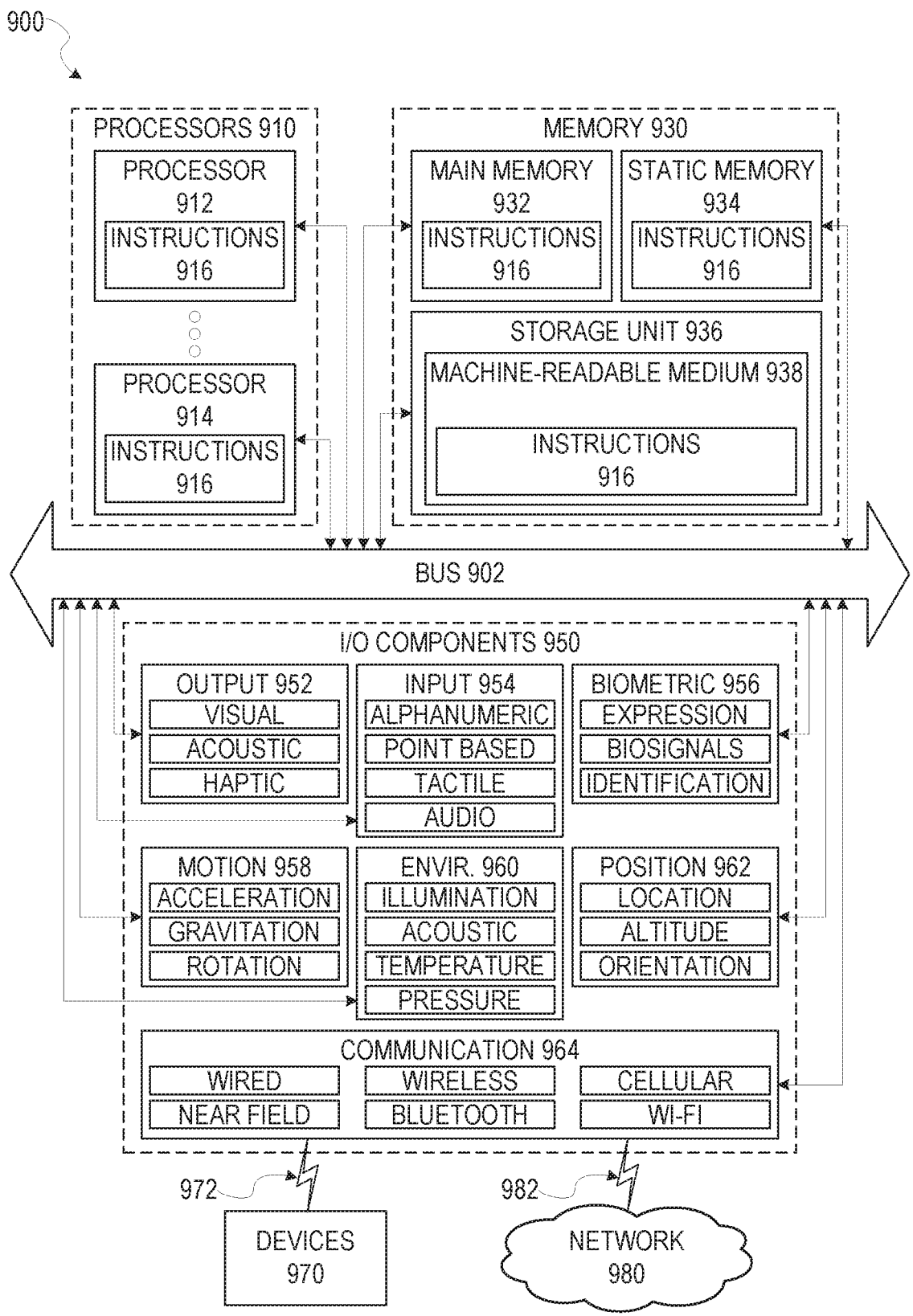
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application 710, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server system 150 or a client device 110, 120, 130 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device 800, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 9 shows multiple processors 910, the machine 900 may include a single processor 910 with a single core, a single processor 910 with multiple cores (e.g., a multi-core processor 910), multiple processors 912, 914 with a single core, multiple processors 912, 914 with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the i/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The IO components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium 938 is incapable of movement; the medium 938 should be considered as being transportable from one physical location to another. Additionally, since the machine-readable medium 938 is tangible, the medium 938 may be considered to be a machine-readable device.

Figure 10:
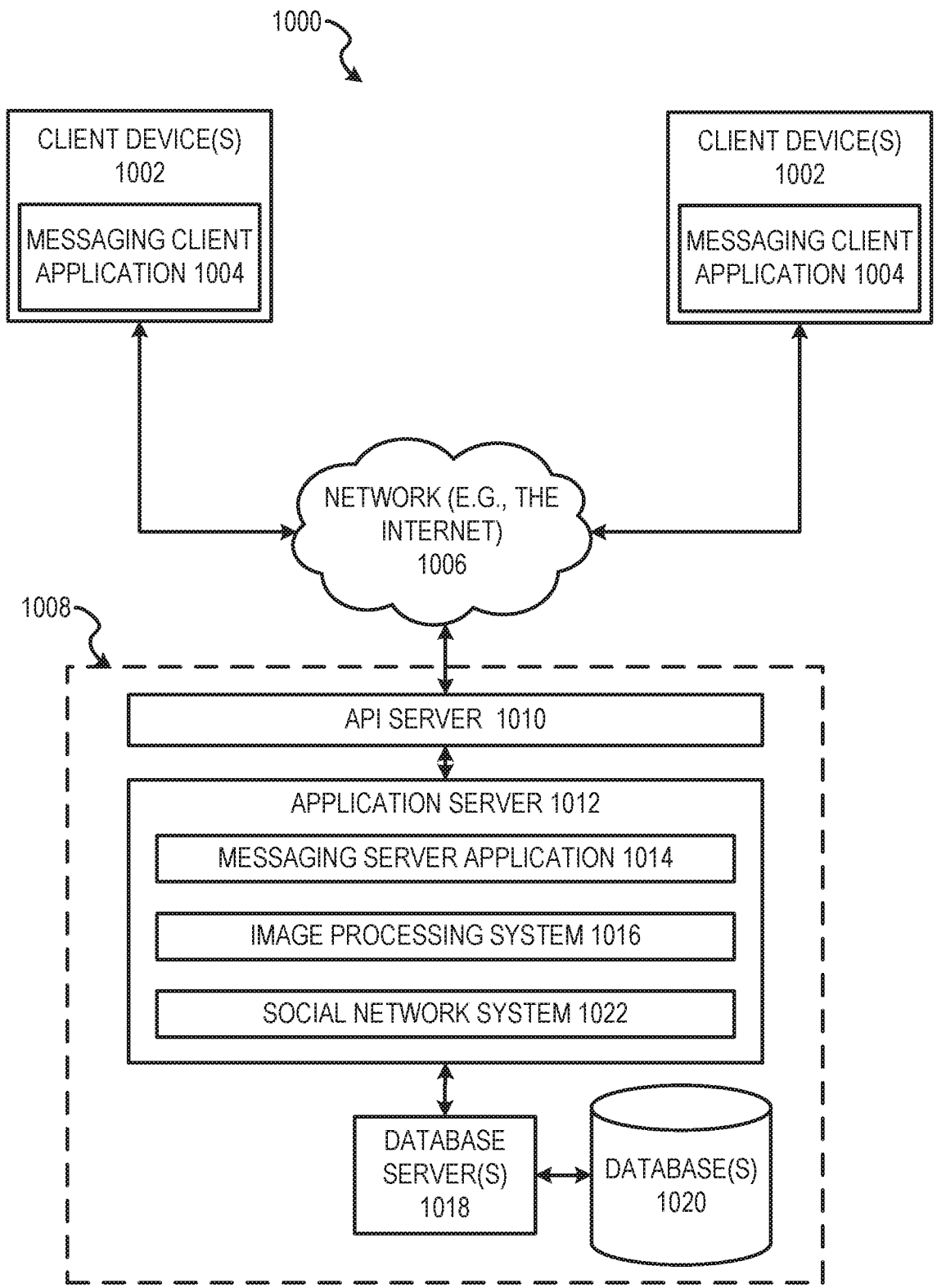
FIG. 10 illustrates a system for chat communications with audio and/or video elements, including user devices communicating via a server system, in accordance with some embodiments.

FIG. 10 illustrates aspects of a communication system which implements chat with embedded audio and/or video in accordance with some embodiments. This includes a block diagram showing an example messaging system 1000 for exchanging data (e.g., messages and associated content) over a network. The messaging system 1000 includes multiple client devices 1002, each of which hosts a number of applications including a messaging client application 1004. Each messaging client application 1004 is communicatively coupled to other instances of the messaging client application 1004 and a messaging server system 1008 via a network 1006 (e.g., the Internet).

Accordingly, each messaging client application 1004 is able to communicate and exchange data with another messaging client application 1004 and with the messaging server system 1008 via the network 1006. The data exchanged between messaging client applications 1004, and between a messaging client application 1004 and the messaging server system 1008, includes functions (e.g., commands to invoke functions) as well as payload data (e.g., text, audio, video or other multimedia data).

The messaging server system 1008 provides server-side functionality via the network 1006 to a particular messaging client application 1004. While certain functions of the messaging system 1000 are described herein as being performed by either a messaging client application 1004 or by the messaging server system 1008, it will be appreciated that the location of certain functionality either within the messaging client application 1004 or the messaging server system 1008 is a design choice. For example, it may be technically preferable to initially deploy certain technology and functionality within the messaging server system 1008, but to later migrate this technology and functionality to the messaging client application 1004 where a client device 1002 has a sufficient processing capacity.

The messaging server system 1008 supports various services and operations that are provided to the messaging client application 1004. Such operations include transmitting data to, receiving data from, and processing data generated by the messaging client application 1004. This data may include message content, client device information, geolocation information, media annotation and overlays, message content persistence conditions, social network information, and live event information, as examples. Data exchanges within the messaging system 1000 are invoked and controlled through functions available via user interfaces (UIs) of the messaging client application 1004.

Turning now specifically to the messaging server system 1008, an Application Program Interface (API) server 1010 is coupled to, and provides a programmatic interface to, an application server 1012. The application server 1012 is communicatively coupled to a database server 1018, which facilitates access to database(s) 1020 in which is stored data associated with messages processed by the application server 1012.

Dealing specifically with the Application Program Interface (API) server 1010, this server 1010 receives and transmits message data (e.g., commands and message payloads) between the client device 1002 and the application server 1012. Specifically, the Application Program Interface (API) server 1010 provides a set of interfaces (e.g., routines and protocols) that can be called or queried by the messaging client application 1004 in order to invoke functionality of the application server 1012. The Application Program Interface (API) server 1010 exposes various functions supported by the application server 1012, including account registration, login functionality, the sending of messages, via the application server 1012, from a particular messaging client application 1004 to another messaging client application 1004, the sending of media files (e.g., images or video) from a messaging client application 1004 to the messaging server application 1014, and for possible access by another messaging client application 1004, the setting of a collection of media data (e.g., story), the retrieval of a list of friends of a user of a client device 1002, the retrieval of such collections, the retrieval of messages and content, the addition and deletion of friends to a social graph, the locating of friends within a social graph, opening an application event (e.g., relating to the messaging client application 1004).

The application server 1012 hosts a number of applications and subsystems, including a messaging server application 1014, an image processing system 1016 and a social network system 1022. The messaging server application 1014 implements a number of message processing technologies and functions, particularly related to the aggregation and other processing of content (e.g., textual and multimedia content) included in messages received from multiple instances of the messaging client application 1004. As will be described in further detail, the text and media content from multiple sources may be aggregated into collections of content (e.g., called stories or galleries). These collections are then made available, by the messaging server application 1014, to the messaging client application 1004. Other processor- and memory-intensive processing of data may also be performed server-side by the messaging server application 1014, in view of the hardware requirements for such processing.

The application server 1012 also includes an image processing system 1016 that is dedicated to performing various image processing operations, typically with respect to images or video received within the payload of a message at the messaging server application 1014.

The social network system 1022 supports various social networking functions services, and makes these functions and services available to the messaging server application 1014. To this end, the social network system 1022 maintains and accesses an entity graph within the database 1020. Examples of functions and services supported by the social network system 1022 include the identification of other users of the messaging system 1000 with which a particular user has relationships or is "following", and also the identification of other entities and interests of a particular user.

The application server 1012 is communicatively coupled to a database server 1018, which facilitates access to a database 1020 in which is stored data associated with messages processed by the messaging server application 1014.

Such servers are considered part of a server system for implementing chat and ephemeral chat communications with audio and/or video elements in accordance with the various embodiments described herein. Such servers may thus receive and transmit communications between user devices, and assist in managing connections between user devices and optimizing transmission of content for both two user chat and group chat, including group audio and group video. Such servers may additionally monitor and verify deletion of content in association with ephemeral message triggers, and monitor storage (e.g., screen-capturing and/or local copying) of ephemeral content, and communicate related notifications to devices associated with accounts in chat systems.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   displaying, at a first device, a user interface for chat communication with a second device, the user interface comprising a time-ordered display space for communications with the second device;
   communicating a text message with the second device;
   displaying the text message in first one or more rows within the time-ordered display space of the user interface on the first device;
   communicating a content message comprising audio data with the second device, wherein the content message comprises a video clip;
   displaying an icon associated with the content message in second one or more rows within the time-ordered display space of the user interface on the first device;
   presenting content from the content message by outputting audio from the video clip via a speaker of the first device and displaying video frames from the video clip within a first circular area of the second one or more rows within a time-ordered display space of the user interface;
   monitoring, by the first device, an ephemeral message deletion trigger associated with the content message; and
   deleting the video clip from the first device when a threshold associated with the ephemeral message deletion trigger has been met.

2. The method of claim 1 further comprising:
   receiving, via an input of the first device corresponding to the second one or more rows within the time-ordered display space of the user interface, a command to output content from the content message;
   presenting, via one or more outputs of the first device, the content from the content message;
   receiving, at the first device prior to communication of the content message, an audio stream notifier associated with the second device;
   displaying, in the second one or more rows within the time-ordered display space of the user interface, one or more response inputs associated with the audio stream notifier, wherein the content message comprises a stream of audio data from the second device, and wherein the one or more response inputs comprise at least a listen-only input, a join input, and an ignore input;
   receiving, via the input of the first device, a selection of the join input; and
   in response to the selection of the join input and receipt of the audio stream notifier, establishing a two-way data stream between the first device and the second device.

3. The method of claim 2 further comprising:
   sensing, by the first device, data from a microphone of the first device; and
   automatically adjusting, in response to the data from the first device, an audio connection between an idle state, a talking state, and a listening state based on the data from the microphone and the stream of audio data from the second device.

4. The method of claim 2 further comprising:
   displaying a plurality of identifiers comprising an identifier associated with the second device, wherein the audio stream notifier is associated with audio data from a plurality of devices associated with the plurality of identifiers, and
wherein the content message is received at the first device via a server computer.

5. The method of claim 4 further comprising:
monitoring, by the first device, an ephemeral message deletion trigger associated with the content message;
deleting the content message from the first device when a threshold associated with the ephemeral message deletion trigger has been met; and
communicating, to the server computer, a deletion notification message.

6. The method of claim 4 further comprising:
receiving, at the first device prior to communication of the content message, a video stream notifier associated with the second device,
wherein the icon comprises a portion of at least a first video frame from a stream of video data,
wherein the content message comprises a second stream of video data from the second device, and
wherein presenting the content from the content message comprises displaying video data from the second stream of video data in the second one or more rows within the time-ordered display space of the user interface.

7. The method of claim 6 further comprising:
receiving, at the first device, an input to switch from a video communication to an audio-only communication;
transmitting, by the first device to a server system, a notification of the switch from the video communication to the audio-only communication;
in response to the notification, receiving, from the server computer, a stream of audio data associated with the stream of video data; and
adjusting the presenting of the content from the content message from the displaying of the video data from the stream of video data to an audio-only output associated with an audio icon in the second one or more rows within the time-ordered display space of the user interface.

8. The method of claim 1 wherein the content message comprises an audio file, and
wherein presenting the content from the content message comprises outputting audio from the audio file via a speaker of the first device.

9. The method of claim 1 further comprising:
receiving, at a record input area of the user interface, an input to initiate recording of a second content message;
generating, by the first device in response to the input, second content;
displaying, within third one or more rows within the user interface, a message icon associated with the second content; and
transmitting the second content and the message icon to the second device for display of the message icon in a second user interface of the second device.

10. A first device for display of a chat interface with additional content elements, the first device comprising:
a memory configured to store content data received from a second device via a server system;
a display screen; and
one or more processors coupled to the display screen and the memory and configured to:
display a user interface for chat communication with the second device, the user interface comprising a time-ordered display space for communications with the second device via the server system;
communicate a text message with the second device;
display the text message in first one or more rows within the time-ordered display space of the user interface on the first device;
communicate a content message comprising audio data with the second device, wherein the content message comprises a video clip;
display an icon associated with the content message in second one or more rows within the time-ordered display space of the user interface on the first device;
receive, via an input of the first device corresponding to the second one or more rows within the time-ordered display space of the user interface, a command to output content from the content message;
present, via one or more outputs of the first device, the content from the content message by outputting audio from the video clip via a speaker of the first device and displaying video frames from the video clip within a first circular area of the second one or more rows within the time-ordered display space of the user interface; and
monitor an ephemeral message deletion trigger associated with the content message and delete the video clip from the first device when a threshold associated with the ephemeral message deletion trigger has been met.

11. The first device of claim 10, wherein the one or more processors are further configure to:
display a plurality of identifiers associated with a plurality of devices, the plurality of identifiers comprising an identifier associated with the second device, and the plurality of devices comprising the second device;
receive a plurality of content messages from the plurality of devices via the server system;
display a corresponding icon for each content message of the plurality of content messages within corresponding one or more rows of a time-ordered display area of the user interface;
monitor, an ephemeral message deletion trigger associated with each content message of the plurality of content messages;
delete each corresponding content message from the first device when a corresponding threshold associated with the ephemeral message deletion trigger for corresponding content messages has been met; and
communicate to the server system, for each deletion of each content message of the plurality of content messages, a corresponding deletion notification message.

12. The first device of claim 10, wherein the one or more processors are configured to receive, prior to communication of the content message, a video stream notifier associated with the second device,
wherein the icon comprises a portion of at least a first video frame from a stream of video data,
wherein the content message comprises a second stream of video data from the second device,
wherein presenting the content from the content message comprises displaying video data from the second stream of video data in the second one or more rows within the time-ordered display space of the user interface, and
wherein the one or more processors are further configured to:
receive, at the first device, an input to switch from a video communication to an audio-only communication;

transmit, by the first device to the server system, a notification of the switch from the video communication to the audio-only communication;

in response to the notification, receive, from the server system, a stream of audio data associated with the stream of video data; and adjust the presenting of the content from the content message from the displaying of the video data from the stream of video data to an audio-only output associated with an audio icon in the second one or more rows within the time-ordered display space of the user interface.

13. A non-transitory computer-readable storage medium comprising instructions that, when executed by one or more processors of a first device, cause the first device to perform operations comprising:

displaying a user interface for chat communication with a second device, the user interface comprising a time-ordered display space for communications with the second device;

communicating a text message with the second device;

displaying the text message in first one or more rows within the time-ordered display space of the user interface on the first device;

communicating a content message comprising audio data with the second device, wherein the content message comprises a video clip;

displaying an icon associated with the content message in second one or more rows within the time-ordered display space of the user interface on the first device;

presenting content from the content message by outputting audio from the video clip via a speaker of the first device and displaying video frames from the video clip within a first circular area of the second one or more rows within a time-ordered display space of the user interface;

receiving, at a record input area of the user interface, an input to initiate recording of a second content message;

generating, by the first device in response to the input, second content;

displaying, within third one or more rows within the user interface, a message icon associated with the second content; and transmitting the second content and the message icon to the second device for display of the message icon in a second user interface of the second device.

14. The non-transitory computer-readable storage medium of claim 13, wherein the instructions further cause the first device to perform operations comprising:

receiving, via an input of the first device corresponding to the second one or more rows within the time-ordered display space of the user interface, a command to output content from the content message;

presenting, via one or more outputs of the first device, the content from the content message receiving, at the first device prior to communication of the content message, an audio stream notifier associated with the second device;

displaying, in the second one or more rows within the time-ordered display space of the user interface, one or more response inputs associated with the audio stream notifier, wherein the content message comprises a stream of audio data from the second device, and wherein the one or more response inputs comprise at least a listen-only input, a join input, and an ignore input.

15. The non-transitory computer-readable storage medium of claim 14, wherein the instructions further cause the first device to perform operations comprising:

receiving, via the input of the first device, a selection of the join input;

in response to the selection of the join input and receipt of the audio stream notifier, establishing a two-way data stream between the first device and the second device;

sensing, by the first device, data from a microphone of the first device; and automatically adjusting, in response to the data from the first device, an audio connection between an idle state, a talking state, and a listening state based on the data from the microphone and the stream of audio data from the second device.

16. The non-transitory computer-readable storage medium of claim 14, wherein the content message comprises an audio file, and wherein presenting, via the one or more outputs of the first device, the content from the content message comprises outputting audio from the audio file via a speaker of the first device.

17. The non-transitory computer-readable storage medium of claim 14, wherein the content message comprises a video clip, and wherein presenting, via the one or more outputs of the first device, the content from the content message comprises outputting audio from the video clip via a speaker of the first device and displaying video frames from the video clip within a first circular area of the second one or more rows within the time-ordered display space of the user interface.

* * * * *